United States Patent
Nose et al.

(10) Patent No.: US 12,497,201 B2
(45) Date of Patent: Dec. 16, 2025

(54) PARTICULATE MATTER FILLING METHOD AND PARTICULATE MATTER FILLING DEVICE

(71) Applicant: MITSUBISHI GAS CHEMICAL COMPANY, INC., Tokyo (JP)

(72) Inventors: Shunsuke Nose, Kyoto (JP); Akira Honjoh, Kyoto (JP); Yota Yoshida, Tokyo (JP); Atsushi Inoue, Tokyo (JP); Kazuhiro Maeno, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 18/834,442

(22) PCT Filed: Jan. 26, 2023

(86) PCT No.: PCT/JP2023/002403
§ 371 (c)(1),
(2) Date: Jul. 30, 2024

(87) PCT Pub. No.: WO2023/153224
PCT Pub. Date: Aug. 17, 2023

(65) Prior Publication Data
US 2025/0115382 A1    Apr. 10, 2025

(30) Foreign Application Priority Data
Feb. 10, 2022    (JP) ................................ 2022-019697

(51) Int. Cl.
*B65B 1/36*    (2006.01)
*B65B 1/10*    (2006.01)
(Continued)

(52) U.S. Cl.
CPC .................. *B65B 1/36* (2013.01); *B65B 1/10* (2013.01); *G01F 11/029* (2013.01); *G01F 11/04* (2013.01); *G01F 11/24* (2013.01)

(58) Field of Classification Search
CPC .... B65B 1/04; B65B 1/10; B65B 1/36; B65B 1/363; G01F 11/029; G01F 11/04; G01F 11/06; G01F 11/24
See application file for complete search history.

(56) References Cited

U.S. PATENT DOCUMENTS 4,537,229 A  *  8/1985  Sashiki .................. G01G 13/26
141/81
4,880,150 A  *  11/1989  Navin ..................... G01F 11/24
222/367

(Continued)

FOREIGN PATENT DOCUMENTS

JP         59-51002 A      3/1984
JP         8-40401 A       2/1996
(Continued)

OTHER PUBLICATIONS

International Search Report dated Apr. 18, 2023 in International Bureau of WIPO Patent Application No. PCT/JP2023/002403 with an English translation thereof.

(Continued)

*Primary Examiner* — Nicolas A Arnett
(74) *Attorney, Agent, or Firm* — GREENBLUM & BERNSTEIN, P.L.C.

(57) ABSTRACT

Provided is a particulate matter filling method for measuring the volume of particulate matter and filling the particulate matter into a container, the method being able to improve the performance of a facility while maintaining high quality measurement accuracy. This method includes: moving a first particulate matter fed through a feeding section to a first measuring section; moving a second particulate matter fed (Continued)

through the feeding section to a second measuring section and measuring the first particulate matter; moving the first particulate matter to a first filling section and measuring the second particulate matter; filling the first particulate matter, and then moving the second particulate matter to a second filling section; and filling the second particulate matter.

10 Claims, 10 Drawing Sheets

(51) Int. Cl.
*G01F 11/02* (2006.01)
*G01F 11/04* (2006.01)
*G01F 11/24* (2006.01)

(56) References Cited

U.S. PATENT DOCUMENTS

| | | | |
|---|---|---|---|
| 9,845,167 B1 * | 12/2017 | Parietti | G01F 11/282 |
| 11,207,859 B2 * | 12/2021 | Shimada | B01F 33/8051 |
| 12,259,264 B2 * | 3/2025 | Vine | A47G 19/34 |
| 2003/0041916 A1 * | 3/2003 | Kohashi | B67C 3/202 |
| | | | 141/145 |
| 2007/0228083 A1 * | 10/2007 | Catani | G01F 11/46 |
| | | | 222/452 |
| 2008/0047972 A1 * | 2/2008 | Bartholomew | B01F 33/844 |
| | | | 222/144.5 |
| 2009/0001101 A1 * | 1/2009 | Zahradka | B65B 1/36 |
| | | | 141/340 |
| 2010/0180552 A1 * | 7/2010 | Katada | B65B 57/10 |
| | | | 53/469 |

FOREIGN PATENT DOCUMENTS

| | | |
|---|---|---|
| JP | 2003-72701 A | 3/2003 |
| WO | 2008/142838 A1 | 11/2008 |
| WO | WO-2017025275 A1 * 2/2017 | ............... B65B 1/24 |

OTHER PUBLICATIONS

Written Opinion dated Apr. 18, 2023 in International Bureau of WIPO Patent Application No. PCT/JP2023/002403 with an English translation thereof.

* cited by examiner

PARTICULATE MATTER FILLING METHOD AND PARTICULATE MATTER FILLING DEVICE

TECHNICAL FIELD

The present invention relates to a technique of a particulate matter filling method and a particulate matter filling device.

BACKGROUND ART

Conventionally, various systems have been known regarding a particulate matter filling method for measuring particulate matter and continuously filling the particulate matter into a container.

For example, there are known a flow rate control system that measures the weight of particulate matter and opens an openable lid to pour and fill the particulate matter into a container when the weight of the particulate matter reaches a predetermined weight, an auger system that controls a rotation speed of an auger screw provided in a hopper to control a feeding amount of particulate matter fed from the hopper to a container, and a vessel measuring system that measures the volume of particulate matter stored in advance in a hopper using a vessel provided in a turret lathe, and then introduces and fills the particulate matter in the vessel into the container.

Here, as an example of the vessel measuring system described above, Patent Literature 1 discloses a particulate matter filling device that performs a particulate matter filling method using the system.

Specifically, Patent Literature 1 discloses the particulate matter filling device including: a turret lathe provided to be rotatable in one direction about a drive shaft extending in a vertical direction; a plurality of measuring vessels disposed equidistantly in a circumferential direction about the drive shaft on the turret lathe; a hopper unit disposed at a predetermined location immediately above the turret lathe; and an introduction guide disposed at a predetermined location immediately below the turret lathe.

Then, the particulate matter filling device measures particulate matter and continuously fills the particulate matter into a container according to the following procedures.

That is, first, the turret lathe rotates so that a measuring vessel reaches a position immediately below the hopper unit.

When the measuring vessel reaches the position immediately below the hopper unit, the turret lathe temporarily stops rotating, and a predetermined amount of the particulate matter is introduced from the hopper unit and fed to the measuring vessel (a feeding operation).

When the feeding operation ends, the turret lathe starts to rotate again, and the measuring vessel is moved immediately above the introduction guide.

At this time, the particulate matter in the measuring vessel is leveled by a leveling guide and measured on a volume basis (a measuring operation).

When the measuring operation is performed and the measuring vessel reaches a position immediately above the introduction guide, the turret lathe temporarily stops rotating again, an openable lid provided in the measuring vessel is fully opened, and the particulate matter in the measuring vessel is introduced into the introduction guide.

As a result, the particulate matter measured by leveling using the measuring vessel is filled into the container through the introduction guide (a filling operation).

As the procedures described above are repeatedly performed, a series of operations (the feeding operation, the measuring operation, and the filling operation) for each of the measuring vessels is sequentially performed, and the measured particulate matter is continuously filled into the container by the particulate matter filling device.

CITATIONS LIST

Patent Literature

Patent Literature 1: JP-A H8-40401 Gazette

SUMMARY OF INVENTION

Technical Problems

Recently, in such particulate matter filling devices measuring the volume of particulate matter and continuously filling the particulate matter into a container, there has been an increasing demand for improvement in performance of a facility (the number of times of filling particulate matter into a container per predetermined time).

Here, in the case of the conventional particulate matter filling device described above, the performance of a facility can be improved by increasing the number of measuring vessels, but there is a problem that a size of the turret lathe becomes large so that a size of the entire facility becomes excessively large.

In addition, in the conventional particulate matter filling device, each of the hopper unit performing an introducing operation and the introduction guide performing the filling operation is provided at only one location, and thus, measuring vessels, which have finished the measuring operation and are to be moved the position immediately above the introduction guide, reach the position immediately above the introduction guide sequentially from a measuring vessel which has previously finished the measuring operation. At this time, the turret lathe temporarily stops rotating every time each of the plurality of measuring vessels which have previously finished the measuring operation reaches the position immediately above the introduction guide.

Therefore, as the number of the measuring vessels increases, the measuring vessels into which the particulate matter have been introduced repeat movement (a rotating operation of the turret lathe) and stop (the temporary stop of the rotating operation of the turret plate) many times until reaching the position immediately above the introduction guide, which may cause an error in an amount of the particulate matter already measured in a measuring step.

The present invention has been made in view of the current problems described above, and an object thereof is to provide a particulate matter filling method for measuring the volume of particulate matter and filling the particulate matter into a container and a particulate matter filling device that performs the method, the particulate matter filling method and the particulate matter filling device capable of further improving the performance of a facility while maintaining high quality measurement accuracy without involving an increase in size of the entirety of the facility.

Solutions to Problems

The problems to be solved by the present invention are as described above, and solutions to the problems will be described next.

That is, a particulate matter filling method according to the present invention is a particulate matter filling method for measuring a volume of particulate matter and filling the particulate matter into a container, wherein a feeding section that feeds the particulate matter, a first measuring section and a first filling section disposed in a stated order toward one side with respect to the feeding section, and a second measuring section and a second filling section disposed in a stated order toward the other side with respect to the feeding section are provided, the first measuring section and the second measuring section performing a measuring operation of modifying the volume of the fed particulate matter to a desired volume by leveling, and the first filling section and the second filling section performing a filling operation of introducing the particulate matter modified to have the desired volume into the container, the particulate matter filling method including: a first step for moving first particulate matter fed through the feeding section to the first measuring section toward the one side; a second step for moving second particulate matter fed through the feeding section to the second measuring section toward the other side and performing the measuring operation on the first particulate matter moved to the first measuring section; a third step for moving the first particulate matter modified to have a desired volume by the measuring operation to the first filling section toward the one side and performing the measuring operation on the second particulate matter moved to the second measuring section; a fourth step for performing the filling operation on the first particulate matter moved to the first filling section, and then moving the second particulate matter modified to have a desired volume by the measuring operation to the second filling section toward the other side; and a fifth step for performing the filling operation on the second particulate matter moved to the second filling section.

In this manner, the particulate matter filling method according to the present invention is provided with one feeding section that introduces and feeds the particulate matter and two filling sections (the first filling section and the second filling section) that fill the particulate matter into the container, and thus, it is possible to easily improve the performance of a facility of a device that performs the particulate matter filling method by distributing the particulate matter, which has been fed through the feeding section and subjected to the measuring operation, sequentially to the two filling sections without increasing the number of measuring vessels as in the above-described conventional particulate matter filling device. That is, it is possible to easily improve the performance of the facility of the device that performs the particulate matter filling method without involving an increase in size of the entirety of the facility.

In addition, in the particulate matter filling method according to the present invention, the first measuring section and the first filling section are disposed in the stated order toward the one side in the circumferential direction about the axial center in the vertical direction with respect to the feeding section, and the second measuring section and the second filling section are disposed in the stated order toward the other side in the circumferential direction such that the measuring operation and the filling operation are alternately performed on each of the first particulate matter and the second particulate matter fed through the feeding section by sequentially performing the first step to the fifth step described above.

Therefore, the first particulate matter and the second particulate matter can be immediately filled into the containers by the filling sections, respectively, after the measuring operation ends, and high quality measurement accuracy can be maintained.

In addition, in the particulate matter filling method according to the present invention, the measuring operation is preferably performed by leveling the fed particulate matter in a compressed state in the second step and the third step.

Since the fed particulate matter is leveled in the compressed state in this manner, for example, air existing at the time of feeding can be effectively removed from the particulate matter, and higher quality measurement accuracy on a volume basis can be achieved.

In addition, a particulate matter filling device according to the present invention is a particulate matter filling device that measures a volume of particulate matter and fills the particulate matter into a container, the particulate matter filling device including: a fixed vessel plate disposed horizontally; a movable vessel plate disposed horizontally in contact with a lower surface of the fixed vessel plate, and provided to be rotatable about an axial center in a vertical direction; and a hopper unit disposed immediately above the movable vessel plate, wherein the fixed vessel plate includes a first fixed vessel hole, located on one side in a circumferential direction about the axial center with respect to the hopper unit, and a second fixed vessel hole located on the other side in the circumferential direction, the movable vessel plate includes a first movable vessel hole and a second movable vessel hole, which are located in a stated order toward the one side in the circumferential direction and are able to be disposed coaxially with the first fixed vessel hole, and a third movable vessel hole and a fourth movable vessel hole which are located in a stated order toward the other side in the circumferential direction and are able to be disposed coaxially with the second fixed vessel hole, the first fixed vessel hole and the second fixed vessel hole in the fixed vessel plate are recessed holes that open downward, and have bottom surfaces provided to be movable up and down, and the first movable vessel hole, the second movable vessel hole, the third movable vessel hole, and the fourth movable vessel hole in the movable vessel plate are recessed hole portions that open upward, a bottom surface of the first movable vessel hole and a bottom surface of the third movable vessel hole are provided to be movable up and down, and a bottom surface of the second movable vessel hole and a bottom surface of the fourth movable vessel hole are provided to be openable.

In a particulate matter filling device 1 according to the present invention having such a configuration, as the movable vessel plate rotates to the one side in the circumferential direction about the axial center, the first movable vessel hole is moved from a position immediately below the hopper unit to a position coaxial with the first fixed vessel hole, the second movable vessel hole is moved from the position coaxial with the first fixed vessel hole to a position immediately above the container, the third movable vessel hole is moved from a position coaxial with the second fixed vessel hole to the position immediately below the hopper unit, and the fourth movable vessel hole is moved from the position immediately above the container to the position coaxial with the second fixed vessel hole.

In addition, as the movable vessel plate rotates to the other side in the circumferential direction about the axial center, the first movable vessel hole is moved from the position coaxial with the first fixed vessel hole to the position immediately below the hopper unit, the second movable vessel hole is moved from the position immediately above the container to the position coaxial with the first fixed vessel hole, the third movable vessel hole is moved from the position immediately below the hopper unit to the position coaxial with the second fixed vessel hole, and the fourth movable vessel hole is moved from the position coaxial with the second fixed vessel hole to the position immediately above the container.

Then, since the particulate matter filling device according to the present invention is provided with one section (at the position immediately below the hopper unit) that performs an operation of introducing the particulate matter and two sections (at positions immediately above the containers) that performs an operation of filling the particulate matter into the containers, the particulate matter fed from the hopper unit and for which a measuring operation has been finished is distributed sequentially to the two sections without increasing the number of measuring vessels as in the above-described conventional particulate matter filling device, whereby the performance of a facility of the particulate matter filling device can be easily improved. That is, it is possible to easily improve the performance of the facility of the particulate matter filling device without involving an increase in size of the entirety of the facility.

In addition, in the particulate matter filling device according to the present invention, the hopper unit is provided with the first fixed vessel hole located on the one side in the circumferential direction about the axial center in the vertical direction and the second fixed vessel hole located on the other side in the circumferential direction, and the particulate matter fed from the hopper unit is moved to the first fixed vessel hole and the second fixed vessel hole by the first movable vessel hole and the third movable vessel hole, respectively, is subjected to the measuring operation by leveling between the fixed vessel plate and the moving vessel plate, and then, is moved to the two sections (the positions immediately above the containers) where the filling operation is performed, and a series of these operations (the introducing operation, the measuring operation, and the filling operation) is are alternately performed as the movable vessel plate rotates toward the one side and the other side alternately in the circumferential direction.

Therefore, after being fed from the hopper unit, the first particulate matter moved toward the first fixed vessel hole and the second particulate matter moved toward the second fixed vessel hole can be filled into the containers by the filling sections, respectively, immediately after the end of the measuring operation, and high quality measurement accuracy can be maintained.

In addition, in the particulate matter filling device according to the present invention, preferably, in the movable vessel plate, the first movable vessel hole includes: a first movable vessel-side through hole penetrating in an up-down direction; and an end surface of a first movable vessel-side moving pin that penetrates the first movable vessel-side through hole from below and is slidable in the up-down direction, and the third movable vessel hole includes: a third movable vessel-side through hole penetrating in the up-down direction; and an end surface of a third movable vessel-side moving pin that penetrates the third movable vessel-side through hole from below and is slidable in the up-down direction.

Since the bottom surfaces of the first movable vessel hole and the third movable vessel hole are formed of the end surfaces of the moving pins that slide and move in the through holes in this manner, it is possible to more accurately move the bottom surface of the first movable vessel hole and the bottom surface of the third movable vessel hole up and down.

Therefore, according to the particulate matter filling device of the present invention, the particulate matter fed from the hopper unit is moved to the first fixed vessel hole and the second fixed vessel hole by the first movable vessel hole and the third movable vessel hole, respectively, and the fed particulate matter can be leveled in a more accurately compressed state when the measuring operation by leveling is performed between the fixed vessel plate and a moving vessel plate.

In addition, in the particulate matter filling device according to the present invention, preferably, the movable vessel plate includes: a movement means for moving each of the first movable vessel-side moving pin and the third movable vessel-side moving pin in the up-down direction; and a buffer means interposed between the movement means and each of the first movable vessel-side moving pin and the third movable vessel-side moving pin, the movement means and the buffer means being provided in each of the first movable vessel hole and the third movable vessel hole.

With the particulate matter filling device according to the present invention having such a configuration, even when an unexpected external load is applied to the movement means for moving the bottom surfaces (the end surfaces of the moving pins) of the first movable vessel hole and the third movable vessel hole up and down, the load can be absorbed by the buffer means, and damage to the movement means can be avoided.

In addition, in the particulate matter filling method and the particulate matter filling device according to the present invention, the particulate matter is preferably a desiccant and/or an oxygen absorber.

Even in the case of the particulate matter having such a configuration, it is possible to further improve the facility performance while maintaining the high quality measurement accuracy without involving the increase in size of the entirety of the facility with the particulate matter filling method and the particulate matter filling device according to the present invention.

Advantageous Effects of Invention

As effects of the present invention, the following effects are obtained.

That is, it is possible to further improve the facility performance while maintaining the high quality measurement accuracy without involving the increase in size of the entirety of the facility with the particulate matter filling method and the particulate matter filling device according to the present invention.

BRIEF DESCRIPTION OF DRAWINGS

FIGS. 2A and 2B are views illustrating a configuration of a particulate matter filling device according to the embodiment of the present invention, in which FIG. 2A is a front view thereof and FIG. 2B is a partial sectional plan view as viewed in a direction of an arrow IIB in FIG. 2A.

FIGS. 3A and 3B are views illustrating a state of the particulate matter filling device immediately after first particulate matter is fed to a first movable vessel hole, in which FIG. 3A is a front view thereof and FIG. 3B is a partial sectional plan view as viewed in a direction of an arrow IIIB in FIG. 3A.

FIGS. 4A and 4B are views illustrating a state of the particulate matter filling device immediately after the first particulate matter is moved to a first fixed vessel hole and compressed and second particulate matter is fed to a third movable vessel hole, in which FIG. 4A is a front view thereof and FIG. 4B is a partial sectional plan view as viewed in a direction of an arrow IVB in FIG. 4A.

FIGS. 5A and 5B are views illustrating a state of the particulate matter filling device immediately after the first particulate matter is subjected to a measuring operation by leveling and the second particulate matter is moved to a second fixed vessel hole and compressed, in which FIG. 5A is a front view thereof and FIG. 5B is a partial sectional plan view as viewed in a direction of an arrow VB in FIG. 5A.

FIGS. 6A and 6B are views illustrating a state of the particulate matter filling device immediately after the first particulate matter is moved to a second movable vessel hole, in which FIG. 6A is a front view thereof and FIG. 6B is a partial sectional plan view as viewed in a direction of an arrow VIB in FIG. 6A.

FIGS. 7A and 7B are views illustrating a state of the particulate matter filling device immediately after the first particulate matter is moved immediately above a first container and the second particulate matter is moved to a fourth movable vessel hole, in which FIG. 7A is a front view thereof and FIG. 7B is a partial sectional plan view as viewed in a direction of an arrow VIIB in FIG. 7A.

FIGS. 8A and 8B are views illustrating a state of the particulate matter filling device immediately after the first container is filled with the first particulate matter, in which FIG. 8A is a front view thereof and FIG. 8B is a partial sectional plan view as viewed in a direction of an arrow VIIIB in FIG. 8A.

FIGS. 9A and 9B are views illustrating a state of the particulate matter filling device immediately after the second particulate matter is moved immediately above a second container, in which FIG. 9A is a front view thereof and FIG. 9B is a partial sectional plan view as viewed in a direction of an arrow IXB in FIG. 9A.

FIGS. 10A and 10B are views illustrating a state of the particulate matter filling device immediately after the second container is filled with the second particulate matter, in which FIG. 10A is a front view thereof and FIG. 10B is a partial sectional plan view as viewed in a direction of an arrow XB in FIG. 10A.

DESCRIPTION OF EMBODIMENT

Next, one embodiment of the present invention will be described with reference to FIGS. 1 to 10B.

Note that the following description is given with a front-back direction, a right-left direction, and an up-down direction of a particulate matter filling device 1 defined by directions of arrows illustrated in FIGS. 2A to 10B for convenience.

In addition, a direction of an arrow A illustrated in FIGS. 2 to 10B is defined as a conveyance direction of a pallet 102.
[Particulate Matter Filling Method]

Figure 1:
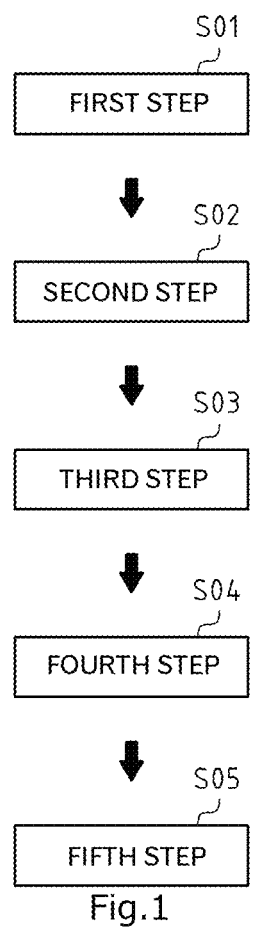
FIG. 1 is a process chart sequentially illustrating procedures of a particulate matter filling method according to an embodiment of the present invention.

First, a particulate matter filling method embodied in the present embodiment will be described with reference to FIGS. 1 to 2B.

The particulate matter filling method according to the present embodiment is a method for measuring the volume of particulate matter W (see FIGS. 2A and 2B) and continuously filling the particulate matter W into a predetermined container 101, and is performed by the particulate matter filling device 1 to be described later.

Figure 2A:
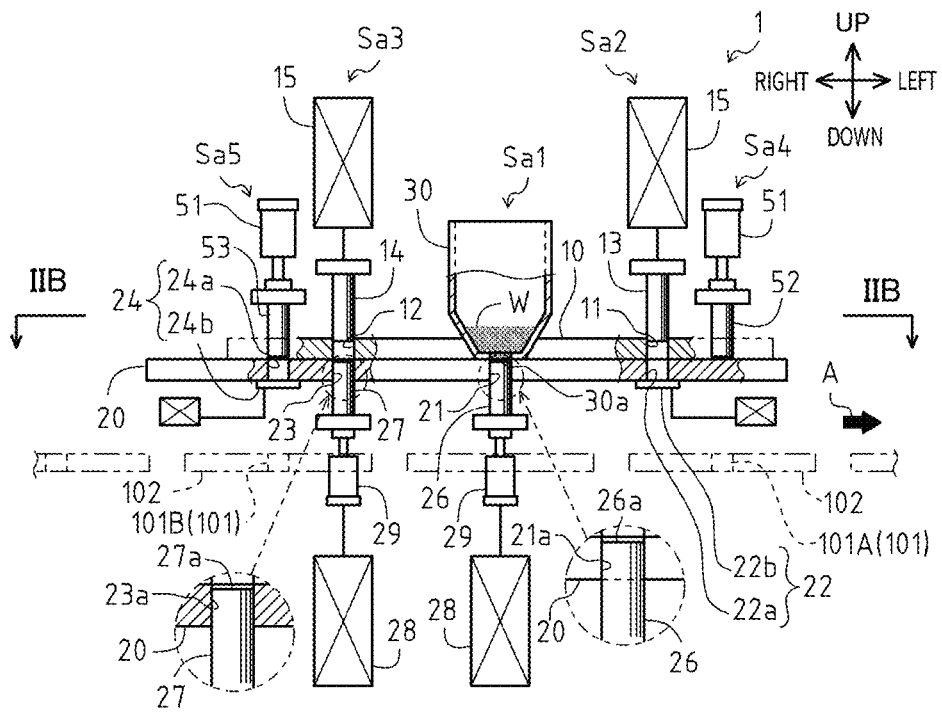
Figure 2B:
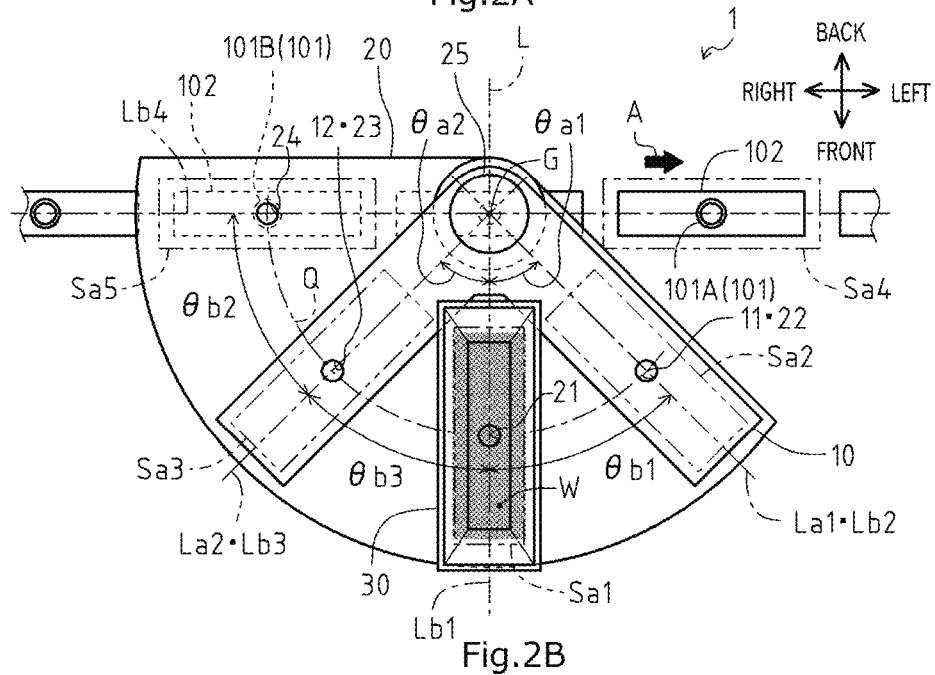

Specifically, as illustrated in FIGS. 2A and 2B, the particulate matter filling method performed mainly by one feeding section Sa1 that feeds the particulate matter W, and two measuring sections (a first measuring section Sa2 and a second measuring section Sa3) and two filling sections (a first filling section Sa4 and a second filling section Sa5) provided for the feeding section Sa1, and is a method in which the particulate matter W fed through the feeding section Sa1 is distributed sequentially to the first measuring section Sa2 and the second measuring section Sa3, and then alternately moved to the first filling section Sa4 and the second filling section Sa5 to continuously fill the container 101.

Here, the first measuring section Sa2 and the second measuring section Sa3 are sections that perform a measuring operation of modifying the volume of the particulate matter W fed through the feeding section Sa1 to have a desired volume by leveling.

Although details will be described later, a first fixed vessel hole 11 and a second fixed vessel hole 12 are disposed in the first measuring section Sa2 and the second measuring section Sa3, respectively, and the particulate matter W fed through the feeding section Sa1 is alternately filled into the first fixed vessel hole 11 and the second fixed vessel hole 12, and then sequentially leveled by a movable vessel plate 20 to be modified (measured) to have each desired volume.

In addition, the first filling section Sa4 and the second filling section Sa5 are sections that perform a filling operation of sequentially introducing the particulate matter W, which has been modified to have each desired volume in the first measuring section Sa2 and the second measuring section Sa3, into the containers 101 and 101 (a first container 101A and a second container 101B to be described later).

In the first filling section Sa4 and the second filling section Sa5, for example, the containers 101 and 101 conveyed in a predetermined direction (a direction of an arrow A in FIGS. 2A and 2B) by pallets 102 and 102 are stopped in the state of reaching predetermined positions, respectively. Although details will be described later, the particulate matter W measured in the first measuring section Sa2 is moved immediately above the container 101 in the first filling section Sa4 by a second movable vessel hole 22, and then filled into the container 101 (the first container 101A), and the particulate matter W measured in the second measuring section Sa3 is moved immediately above the container 101 (the second container 101B) in the second filling section Sa5 by a fourth movable vessel hole 24, and then filled into the container 101.

Then, in each of these sections Sa1 to Sa5, the first measuring section Sa2 and the first filling section Sa4 are disposed in the stated order, for example, toward one side (in the present embodiment, a counterclockwise direction side about an axial center G in FIG. 2B) in a circumferential direction of a virtual circle Q centered on the axial center G in the vertical direction, the second measuring section Sa3 and the second filling section Sa5 are disposed in the stated order toward the other side (in the present embodiment, a clockwise direction side about the axial center G in FIG. 2B) in the circumferential direction of the virtual circle Q, and the volume of the particulate matter W is measured and continuously filled into the predetermined container 101 by sequentially performing a first step S01 to a fifth step S05 (see FIG. 1) to be described below.

That is, in FIGS. 1, 2A, and 2B, the first step S01 is a step for moving the particulate matter W (hereinafter, appropriately referred to as "first particulate matter W1 (see FIG. 3A)") fed through the feeding section Sa1 to the first measuring section Sa2 toward the one side.

As will be described later, the first particulate matter W1 is moved to the first measuring section Sa2 by a first movable vessel hole 21 provided in the movable vessel plate 20 rotatable about the axial center G.

As a result, a third movable vessel hole 23 which is provided in the movable vessel plate 20 and to which the particulate matter W is not yet fed is moved to the feeding section Sa1.

The second step S02 is a step for moving the particulate matter W (hereinafter, appropriately referred to as "second particulate matter W2 (see FIG. 4A)") fed through the feeding section Sa1 to the second measuring section Sa3 toward the other side and performing the above-described measuring operation on the first particulate matter W1 moved to the first measuring section Sa2.

The first particulate matter W1 moved to the first measuring section Sa2 in the first step S01 is temporarily filled into the first fixed vessel hole 11 as described above.

Thereafter, the second particulate matter W2 is moved to the second measuring section Sa3, and the first particulate matter W1 is leveled by the movable vessel plate 20 and is modified (measured) to have a desired volume.

The third step S03 is a step for moving the first particulate matter W1 modified to have the desired volume by the above-described measuring operation to the first filling section Sa4 toward the one side and performing the above-described measuring operation on the second particulate matter W2 moved to the second measuring section Sa3.

The second particulate matter W2 moved to the second measuring section Sa3 in the second step S02 is temporarily filled into the second fixed vessel hole 12 as described above.

On the other hand, the first particulate matter W1 measured in the second step S02 is transferred from the first fixed vessel hole 11 to the second movable vessel hole 22, and then moved to the first filling section Sa4 by the second movable vessel hole 22.

As a result, the second particulate matter W2 is leveled by the movable vessel plate 20, and is modified (measured) to have a desired volume.

The fourth step S04 is a step for performing the above-described filling operation on the first particulate matter W1 moved to the first filling section Sa4, and then moving the second particulate matter W2 having the desired volume by the above-described measuring operation to the second filling section Sa5 toward the other side.

The second particulate matter W2 measured in the third step S03 is transferred from the second fixed vessel hole 12 to the fourth movable vessel hole 24, and the second particulate matter W2 is moved to the second filling section Sa5 by the fourth movable vessel hole 24 as described above after the filling operation of the first particulate matter W1 ends.

The fifth step S05 is a step for performing the above-described filling operation on the second particulate matter W2 moved to the second filling section Sa5.

When the fifth step S05 ends, a series of steps in the particulate matter filling method according to the present embodiment is completed.

Note that the series of steps of the first step S01 to the fifth step S05 may be repeated again after the series of steps of the first step S01 to the fifth step S05 described above ends in the particulate matter filling method according to the present embodiment. However, new particulate matter W may be immediately fed through the feeding section Sa1 to the first movable vessel hole 21, which is in a substantially empty state after the first particulate matter W1 is filled into the first fixed vessel hole 11 in the second step S02, and then, new particulate matter W may be immediately fed through the feeding section Sa1 to the third movable vessel hole 23, which is in a substantially empty state after the second particulate matter W2 is filled into the second fixed vessel hole 12 in the third step S03.

In this case, the particulate matter W fed through the feeding section Sa1 reaches the first filling section Sa4 and the second filling section Sa5 alternately without interruption, and is continuously filled into the predetermined container 101.

As described above, the particulate matter filling method according to the present embodiment is a particulate matter filling method for measuring the volume of particulate matter W and filling the particulate matter W into the container 101, and is performed by the feeding section Sa1 that feeds the particulate matter W, the first measuring section Sa2 and the first filling section Sa4 disposed in the stated order toward one side (more specifically, one side in a circumferential direction about the axial center G in a vertical direction) with respect to the feeding section Sa1, and the second measuring section Sa3 and the second filling section Sa5 disposed in the stated order toward the other side (more specifically, the other side in the circumferential direction about the axial center G in the vertical direction) with respect to the feeding section Sa1.

Here, the first measuring section Sa2 and the second measuring section Sa3 perform a measuring operation of modifying the volume of the fed particulate matter W to a desired volume by leveling, and the first filling section Sa4 and the second filling section Sa5 perform a filling operation of introducing the particulate matter W modified to have the desired volume into the container 101.

Then, the particulate matter filling method according to the present embodiment includes: the first step S01 for moving the first particulate matter W1 fed through the feeding section Sa1 to the first measuring section Sa2 toward the one side; the second step S02 for moving the second particulate matter W2 fed through the feeding section Sa1 to the second measuring section Sa3 toward the other side and performing the measuring operation on the first particulate matter W1 moved to the first measuring section Sa2; the third step S03 for moving the first particulate matter W1 modified to have a desired volume by the measuring operation to the first filling section Sa4 toward the one side and performing the measuring operation on the second particulate matter W2 moved to the second measuring section Sa3; the fourth step S04 for performing the filling operation on the first particulate matter W1 moved to the first filling section Sa4, and then moving the second particulate matter W2 modified to have a desired volume by the measuring operation to the second filling section Sa5 toward the other side; and the fifth step S05 for performing the filling operation on the second particulate matter W2 moved to the second filling section Sa5.

In this manner, the particulate matter filling method according to the present embodiment is provided with the single feeding section Sa1 that introduces and feeds the particulate matter W and two filling sections (the first filling section Sa4 and the second filling section Sa5) that fill the particulate matter W into the container 101, and thus, it is possible to easily improve the performance of a facility of the particulate matter filling device 1 that performs the particulate matter filling method by distributing the particulate matter W, which has been fed through the feeding section Sa1 and subjected to the measuring operation, sequentially to the two filling sections without increasing the number of measuring vessels as in the above-described conventional particulate matter filling device.

That is, it is possible to easily improve the performance of the facility of the device that performs the particulate matter filling method without involving an increase in size of the entirety of the facility.

In addition, in the particulate matter filling method according to the present embodiment, the first measuring section Sa2 and the first filling section Sa4 are disposed in the stated order toward the one side in the circumferential direction about the axial center G in the vertical direction with respect to the feeding section Sa1, and the second measuring section Sa3 and the second filling section Sa5 are disposed in the stated order toward the other side in the circumferential direction such that the measuring operation and the filling operation are alternately performed on each of the first particulate matter W1 and the second particulate matter W2 fed through the feeding section Sa1 by sequentially performing the first step S01 to the fifth step S05 described above.

Therefore, the first particulate matter W1 and the second particulate matter W2 can be immediately filled into the containers by the filling sections (the first filling section Sa4 and the second filling section Sa5), respectively, after the measuring operation ends, and high quality measurement accuracy can be maintained.

[Configuration of Particulate Matter Filling Device 1]

Next, the configuration of the particulate matter filling device 1 according to the present embodiment will be described with reference to FIGS. 2A and 2B.

The particulate matter filling device 1 according to the present embodiment is a device that continuously fills the predetermined container 101 while measuring the volume of the particulate matter W by sequentially performing the first step S01 to the fifth step S05 described above.

Specifically, as described above, the particulate matter filling device 1 includes the feeding section Sa1 that feeds the particulate matter W, the first measuring section Sa2 and the first filling section Sa4 disposed in the stated order toward the one side (the counterclockwise direction side about the axial center G in FIG. 2B) in the circumferential direction of the virtual circle Q about the axial center G in the vertical direction with respect to the feeding section Sa1, and the second measuring section Sa3 and the second filling section Sa5 disposed in the stated order toward the other side (the clockwise direction side about the axial center G in FIG. 2B) in the circumferential direction with respect to the feeding section Sa1.

Then, the particulate matter filling device 1 causes the particulate matter W fed through the feeding section Sa1 to be distributed sequentially to the first measuring section Sa2 and the second measuring section Sa3 and then alternately moved to the first filling section Sa4 and the second filling section Sa5, thereby continuously filling the container 101 with the particulate matter W measured on a volume basis.

The particulate matter filling device 1 mainly includes a fixed vessel plate 10 disposed horizontally, the movable vessel plate 20 disposed horizontally in contact with a lower surface of the fixed vessel plate 10 and provided to be rotatable about the axial center G in the vertical direction, and a hopper unit 30 disposed immediately above the movable vessel plate 20.

The fixed vessel plate 10 is a member that provides fixed vessel holes (the first fixed vessel hole 11 and the second fixed vessel hole 12) for performing the above-described measuring operation in the first measuring section Sa2 and the second measuring section Sa3, respectively.

The fixed vessel plate 10 is formed of, for example, a flat plate member having an L shape in a plan view, and is disposed to extend from the axial center G toward each of the first measuring section Sa2 and the second measuring section Sa3 with respect to the hopper unit 30.

Then, in the fixed vessel plate 10, the first fixed vessel hole 11 and the second fixed vessel hole 12 each having the axial direction along the up-down direction are provided on the virtual circle Q centered on the axial center G.

The first fixed vessel hole 11 is located at the one side (the counterclockwise direction side) in the circumferential direction of the virtual circle Q with respect to the hopper unit 30, and is provided in the first measuring section Sa2.

In addition, the second fixed vessel hole 12 is located on the other side (the clockwise direction side) in the circumferential direction of the virtual circle Q with respect to the hopper unit 30, and is provided in the second measuring section Sa3.

Then, the first fixed vessel hole 11 and the second fixed vessel hole 12 are disposed at an equal distance with respect to the hopper unit 30.

Specifically, with respect to a reference axis L passing through the axial center G and the center of the hopper unit 30 in the plan view, a first angle $\theta a1$ formed by a first virtual line La1 passing through the axial center G and the center of the first fixed vessel hole 11 and a second angle $\theta a2$ formed by a second virtual line La2 passing through the axial center G and the center of the second fixed vessel hole 12 are set to be equal ($\theta a1 = \theta a2$).

The first fixed vessel hole 11 is provided with a first fixed vessel-side moving pin 13 slidable along the first fixed vessel hole 11 from above.

In addition, the second fixed vessel hole 12 is provided with a second fixed vessel-side moving pin 14 slidable along the second fixed vessel hole 12 from above.

Then, the first fixed vessel-side moving pin 13 and the second fixed vessel-side moving pin 14 are provided so as to be movable in the up-down direction by electric actuators 15 and 15 each using a servomotor or the like as a drive source.

In this manner, the first fixed vessel hole 11 is configured as a recessed hole portion that has a bottom surface formed of a distal end surface of the first fixed vessel-side moving pin 13 and opens downward, and the bottom surface is movable up and down by moving the first fixed vessel-side moving pin 13 up and down using the electric actuator 15.

Then, the first fixed vessel hole 11 is configured such that an internal volume of the first fixed vessel hole 11 can be changed by moving the first fixed vessel-side moving pin 13 up and down.

In addition, the particulate matter W (the first particulate matter W1) subjected to the measuring operation is moved from the first fixed vessel hole 11 to the second movable vessel hole 22 to be described later by moving (lowering) the first fixed vessel-side moving pin 13 down in the third step S03 described above.

In addition, the second fixed vessel hole 12 is configured as a recessed hole portion that has a bottom surface formed of a distal end surface of the second fixed vessel-side moving pin 14 and opens downward, and the bottom surface is movable up and down by moving the second fixed vessel-side moving pin 14 up and down using the electric actuator 15.

Then, the second fixed vessel hole 12 is configured such that an internal volume of the second fixed vessel hole 12 can be changed by moving the second fixed vessel-side moving pin 14 up and down.

In addition, the particulate matter W (the second particulate matter W2) subjected to the measuring operation is moved from the second fixed vessel hole 12 to the fourth movable vessel hole 24 to be described later by moving (lowering) the second fixed vessel-side moving pin 14 down in the fourth step S04 described above.

The movable vessel plate 20 is a member that provides each of movable vessel holes (the first movable vessel hole 21, the second movable vessel hole 22, the third movable vessel hole 23, and the fourth movable vessel hole 24) for moving the fed particulate matter W between adjacent two of the sections Sa1 to Sa5 and levels the fed particulate matter W in the first measuring section Sa2 and the second measuring section Sa3.

The movable vessel plate 20 is formed of, for example, a flat plate member having a fan shape in the plan view, and is disposed so as to be rotatable (slidable with respect to the fixed vessel plate 10) about a rotation axis 25, coaxial with the axial center G, with an upper surface being in contact with the lower surface of the fixed vessel plate 10 as described above.

Then, in the movable vessel plate 20, the first movable vessel hole 21, the second movable vessel hole 22, the third movable vessel hole 23, and the fourth movable vessel hole 24 each having the axial direction along the up-down direction are provided on the virtual circle Q centered on the axial center G.

The first movable vessel hole 21 and the second movable vessel hole 22 are located in the stated order toward the one side (the counterclockwise direction side) in the circumferential direction of the virtual circle Q, and can be disposed coaxially with the first fixed vessel hole 11 by the rotation of the movable vessel plate 20.

In addition, the third movable vessel hole 23 and the fourth movable vessel hole 24 are located in the stated order toward the other side (the clockwise direction side) in the circumferential direction of the virtual circle Q, and can be disposed coaxially with the second fixed vessel hole 12 by the rotation of the movable vessel plate 20.

Further, the first movable vessel hole 21 and the third movable vessel hole 23 can be disposed immediately below the hopper unit 30 by the rotation of the movable vessel plate 20.

Then, the first movable vessel hole 21, the second movable vessel hole 22, the third movable vessel hole 23, and the fourth movable vessel hole 24 are disposed at a distance equivalent to the above-described distance of the first fixed vessel hole 11 and the second fixed vessel hole 12 with respect to the hopper unit 30.

Specifically, in the plan view, a third angle $\theta b1$ formed by a first virtual line Lb1 passing through the axial center G and the center of the first movable vessel hole 21 and a second virtual line Lb2 passing through the axial center G and the center of the second movable vessel hole 22, a fourth angle $\theta b2$ formed by a third virtual line Lb3 passing through the axial center G and the center of the third movable vessel hole 23 and a fourth virtual line Lb4 passing through the axial center G and the center of the fourth movable vessel hole 24, and a fifth angle $\theta b3$ formed by the first virtual line Lb1 and the third virtual line Lb3 are set to be equal to the above-described first angle $\theta a1$ (or the second angle $\theta a2$) ($\theta b1 = \theta b2 = \theta b3 = \theta a1 (= \theta a2)$).

With such a configuration, when the movable vessel plate 20 rotates about the rotation axis 25 (that is, the axial center G) toward the one side (the counterclockwise direction side) and the other side (the clockwise direction side) in the circumferential direction of the virtual circle Q by a predetermined angle (in the present embodiment, the first angle $\theta a1$ (or the second angle $\theta a2$) described above), each of the first movable vessel hole 21, the second movable vessel hole 22, the third movable vessel hole 23, and the fourth movable vessel hole 24 is simultaneously moved toward a predetermined position.

For example, when the movable vessel plate 20 rotates toward the one side (the counterclockwise direction side) by the predetermined angle (the first angle $\theta a1$ (or the second angle $\theta a2$)), the first movable vessel hole 21 is moved from a position immediately below the hopper unit 30 to a position coaxial with the first fixed vessel hole 11, the second movable vessel hole 22 is moved from the position coaxial with the first fixed vessel hole 11 to the first filling section Sa4 (more specifically, a position immediately above the container 101), the third movable vessel hole 23 is moved from a position coaxial with the second fixed vessel hole 12 to the position immediately below the hopper unit 30, and the fourth movable vessel hole 24 is moved from the second filling section Sa5 (more specifically, the position immediately above the container 101) to the position coaxial with the second fixed vessel hole.

In addition, when the movable vessel plate 20 rotates toward the other side (the clockwise direction side) by the predetermined angle (the first angle $\theta a1$ (or the second angle $\theta a2$)), the first movable vessel hole 21 is moved from the position coaxial with the first fixed vessel hole 11 to the position immediately below the hopper unit 30, the second movable vessel hole 22 is moved from the first filling section Sa4 (more specifically, the position immediately above the container 101) to the position coaxial with the first fixed vessel hole 11, the third movable vessel hole 23 is moved from the position immediately below the hopper unit 30 to the position coaxial with the second fixed vessel hole 12, and the fourth movable vessel hole 24 is moved from the position coaxial with the second fixed vessel hole 12 to the second filling section Sa5 (more specifically, the position immediately above the container 101).

The first movable vessel hole 21 is provided with a first movable vessel-side moving pin 26 slidable along the first movable vessel hole 21 from below.

That is, the first movable vessel hole 21 includes a first movable vessel-side through hole 21a penetrating in the up-down direction and an end surface 26a of the first movable vessel-side moving pin 26 that penetrates the first movable vessel-side through hole 21a from below and is slidable in the up-down direction.

In addition, the third movable vessel hole 23 is provided with a third movable vessel-side moving pin 27 slidable along the third movable vessel hole 23 from below.

That is, the third movable vessel hole 23 includes a third movable vessel-side through hole 23a penetrating in the up-down direction, and an end surface 27a of the third movable vessel-side moving pin 27 that penetrates the third movable vessel-side through hole 23a from below and is slidable in the up-down direction.

Then, the first movable vessel-side moving pin 26 and the third movable vessel-side moving pin 27 are examples of a movement means according to the present invention, and are provided so as to be movable in the up-down direction by electric actuators 28 and 28 each using a servomotor or the like as a drive source.

In addition, buffer means 29 and 29 each including, for example, a pneumatic actuator or the like are provided between the first movable vessel-side moving pin 26 and the electric actuator 28 and between the third movable vessel-side moving pin 27 and the electric actuator 28, respectively.

In other words, in the present embodiment, the movable vessel plate 20 includes the electric actuators 28 and 28 (the movement means), which are provided in the first movable vessel hole 21 and the third movable vessel hole 23 and move the first movable vessel-side moving pin 26 and the third movable vessel-side moving pin 27, respectively, in the up-down direction, and the buffer means 29 and 29 interposed between the first movable vessel-side moving pin 26 and the electric actuator 28 and between the third movable vessel-side moving pin 27 and the electric actuator 28, respectively.

According to the particulate matter filling device 1 of the present embodiment having such a configuration, even in a case where an unexpected external load is applied to the electric actuators 28 moving bottom surfaces of the first movable vessel hole 21 and the third movable vessel hole 23 (the end surface 26*a* of the first movable vessel-side moving pin 26 and the end surface 27*a* of the third movable vessel-side moving pin 27) up and down, the load can be absorbed by the buffer means 29, and damage to the electric actuator 28 can be avoided.

In this manner, the first movable vessel hole 21 is configured as a recessed hole portion that has the bottom surface formed of a distal end surface of the first movable vessel-side moving pin 26 and opens upward, and the bottom surface is movable up and down by moving the first movable vessel-side moving pin 26 up and down by the electric actuator 28.

Then, the particulate matter W (the first particulate matter W1) fed from the hopper unit 30 is moved from the first movable vessel hole 21 to the first fixed vessel hole 11 by moving (raising) the first movable vessel-side moving pin 26 upward in the second step S02 described above, and the particulate matter W (the first particulate matter W1) is compressed when leveling is performed in the measuring operation as will be described later.

In addition, the third movable vessel hole 23 is configured as a recessed hole portion that has the bottom surface formed of a distal end surface of the third movable vessel-side moving pin 27 and opens upward, and is movable up and down by moving the third movable vessel-side moving pin 27 up and down by the electric actuator 28.

Then, the particulate matter W (the second particulate matter W2) fed from the hopper unit 30 is moved from the third movable vessel hole 23 to the second fixed vessel hole 12 by moving (raising) the third movable vessel-side moving pin 27 upward in the third step S03 described above, and the particulate matter W (the second particulate matter W2) is compressed when leveling is performed in the measuring operation as will be described later.

Note that, in the present embodiment, the bottom surfaces of the first movable vessel hole 21 and the third movable vessel hole 23 are formed of the end surfaces 26*a* and 27*a*, respectively, of the moving pins (the first movable vessel-side moving pin 26 and the third movable vessel-side moving pin 27) that slide and move along the through holes (the first movable vessel-side through hole 21*a* and the third movable vessel-side through hole 23*a*) as described above, and thus, the bottom surface of the first movable vessel hole 21 and the bottom surface of the third movable vessel hole 23 can be moved up and down more accurately.

Therefore, according to the particulate matter filling device 1 of the present embodiment, the particulate matter W fed from the hopper unit 30 is moved to the first fixed vessel hole 11 and the second fixed vessel hole 12 by the first movable vessel hole 21 and the third movable vessel hole 23, respectively, and the fed particulate matter W can be leveled in a more accurately compressed state when the measuring operation by leveling is performed between the fixed vessel plate 10 and the movable vessel plate 20.

The second movable vessel hole 22 includes a second movable vessel-side through hole 22*a* penetrating in the up-down direction, and a second movable vessel-side openable lid 22*b* provided at a lower end of the second movable vessel-side through hole 22*a* so as to be openable and closable.

In addition, the fourth movable vessel hole 24 includes a fourth movable vessel-side through hole 24*a* penetrating in the up-down direction, and a fourth movable vessel-side openable lid 24*b* provided at a lower end of the fourth movable vessel-side through hole 24*a* so as to be openable and closable.

Then, in the first filling section Sa4, a first moving pin for filling 52 movable in the up-down direction is disposed by a movable means 51 including, for example, a pneumatic actuator or the like, and the first moving pin for filling 52 is configured to be slidable from above with respect to the second movable vessel hole 22 that has reached a predetermined position (position immediately above the container 101) of the first filling section Sa4.

In addition, also in the second filling section Sa5, a second moving pin for filling 53 movable in the up-down direction is disposed by the movable means 51 similarly, and the second moving pin for filling 53 is configured to be slidable from above with respect to the fourth movable vessel hole 24 that has reached a predetermined position (position immediately above the container 101) of the second filling section Sa5.

In this manner, the second movable vessel hole 22 is configured as a recessed hole portion that has a bottom surface formed of the second movable vessel-side openable lid 22*b* and opens upward, and the bottom surface can be opened by moving the second movable vessel-side openable lid 22*b* to an open state.

Then, in the fourth step S04 described above, the second movable vessel-side openable lid 22*b* is moved to the open state, and then the first moving pin for filling 52 is moved downward (lowered), so that the particulate matter W (the first particulate matter W1) for which the measuring operation has been finished is caused to fall from the second movable vessel hole 22 to be filled into the container 101.

In addition, the fourth movable vessel hole 24 is configured as a recessed hole portion that has a bottom surface formed of the fourth movable vessel-side openable lid 24*b* and opens upward, and the bottom surface can be opened by moving the fourth movable vessel-side openable lid 24*b* to an open state.

Then, in the fifth step S05 described above, the fourth movable vessel-side openable lid 24*b* is moved to the open state, and then the second moving pin for filling 53 is moved downward (lowered), so that the particulate matter W (the second particulate matter W2) for which the measuring operation has been finished is caused to fall from the fourth movable vessel hole 24 to be filled into the container 101.

The hopper unit 30 stores a predetermined amount of particulate matter W in advance, and feeds the particulate matter W to each of the first movable vessel hole 21 and the third movable vessel hole 23 having reached immediately below.

The hopper unit 30 is disposed immediately above the virtual circle Q in the movable vessel plate 20 in a state where an introduction port 30a faces downward in the feeding section Sa1.

Then, as described above, when the movable vessel plate 20 rotates toward the other side (the clockwise direction side) by the predetermined angle (the first angle θa1 (or the second angle θa2)) so that the first movable vessel hole 21 reaches the position immediately below the hopper unit 30, the hopper unit 30 feeds the particulate matter W (the first particulate matter W1) to the first movable vessel hole 21.

In addition, when the movable vessel plate 20 rotates toward the one side (the counterclockwise direction side) by the predetermined angle (the first angle θa1 (or the second angle θa2)) so that the third movable vessel hole 23 reaches the position immediately below the hopper unit 30, the hopper unit 30 feeds the particulate matter W (the second particulate matter W2) to the third movable vessel hole 23.

As described above, the particulate matter filling device 1 according to the present embodiment is a particulate matter filling device that measures the volume of particulate matter W and fills the particulate matter W into the container 101, and includes the fixed vessel plate 10 disposed horizontally, the movable vessel plate 20 disposed horizontally in contact with a lower surface of the fixed vessel plate 10 and provided to be rotatable about the axial center G in a vertical direction, and the hopper unit 30 disposed immediately above the movable vessel plate 20.

Here, the fixed vessel plate 10 has the first fixed vessel hole 11 located on one side in a circumferential direction about the axial center G with respect to the hopper unit 30 and the second fixed vessel hole 12 located on the other side in the circumferential direction.

In addition, the movable vessel plate 20 includes the first movable vessel hole 21 and the second movable vessel hole 22 located in the stated order toward the one side in the circumferential direction and can be disposed coaxially with the first fixed vessel hole 11, and the third movable vessel hole 23 and the fourth movable vessel hole 24 located in the stated order toward the other side in the circumferential direction and can be disposed coaxially with the second fixed vessel hole 12.

Then, in the fixed vessel plate 10, the first fixed vessel hole 11 and the second fixed vessel hole 12 are recessed hole portions that open downward and have bottom surfaces provided to be movable up and down.

In addition, in the movable vessel plate 20, the first movable vessel hole 21, the second movable vessel hole 22, the third movable vessel hole 23, and the fourth movable vessel hole 24 are recessed hole portions that open upward, a bottom surface of the first movable vessel hole 21 and a bottom surface of the third movable vessel hole 23 are provided to be movable up and down, and a bottom surface of the second movable vessel hole 22 and a bottom surface of the fourth movable vessel hole 24 are provided to be openable.

In the particulate matter filling device 1 according to the present embodiment having such a configuration, as the movable vessel plate 20 rotates to the one side in the circumferential direction about the axial center G, the first movable vessel hole 21 is moved from a position immediately below the hopper unit 30 to a position coaxial with the first fixed vessel hole 11, the second movable vessel hole 22 is moved from the position coaxial with the first fixed vessel hole 11 to a position immediately above the container 101, the third movable vessel hole 23 is moved from a position coaxial with the second fixed vessel hole 12 to the position immediately below the hopper unit 30, and the fourth movable vessel hole 24 is moved from the position immediately above the container 101 to the position coaxial with the second fixed vessel hole 12.

In addition, as the movable vessel plate 20 rotates to the other side in the circumferential direction about the axial center G, the first movable vessel hole 21 is moved from the position coaxial with the first fixed vessel hole 11 to the position immediately below the hopper unit 30, the second movable vessel hole 22 is moved from the position immediately above the container 101 to the position coaxial with the first fixed vessel hole 11, the third movable vessel hole 23 is moved from the position immediately below the hopper unit 30 to the position coaxial with the second fixed vessel hole 12, and the fourth movable vessel hole 24 is moved from the position coaxial with the second fixed vessel hole 12 to the position immediately above the container 101.

Then, since the particulate matter filling device 1 according to the present embodiment is provided with one feeding section Sa1 (at the position immediately below the hopper unit 30) that performs an operation of introducing the particulate matter W and two first filling section Sa4 and second filling section Sa5 (at a position immediately above the first container 101A and a position immediately above the second container 101B to be described later) that perform an operation of filling the particulate matter W into the container 101, the particulate matter W fed from the hopper unit 30 and for which the measuring operation has been finished is distributed sequentially to the two first filling section Sa4 and second filling section Sa5 without increasing the number of measuring vessels as in the above-described conventional particulate matter filling device, whereby the performance of a facility of the particulate matter filling device 1 can be easily improved.

That is, it is possible to easily improve the performance of the facility of the particulate matter filling device 1 without involving an increase in size of the entirety of the facility.

In addition, the particulate matter filling device 1 according to the present embodiment is provided with the first fixed vessel hole 11 located on the one side in the circumferential direction about the axial center G in the vertical direction with respect to the hopper unit 30 and the second fixed vessel hole 12 located on the other side in the circumferential direction, and the particulate matter W fed from the hopper unit 30 is moved to the first fixed vessel hole 11 and the second fixed vessel hole 12 by the first movable vessel hole 21 and the third movable vessel hole 23, respectively, is subjected to the measuring operation by leveling between the fixed vessel plate 10 and the movable vessel plate 20, and then, is moved to the two first filling section Sa4 and second filling section Sa5 (the position immediately above the first container 101A and the position immediately above the second container 101B) where the filling operation is performed, and a series of these operations (the introducing operation, the measuring operation, and the filling operation) is are alternately performed as the movable vessel plate 20 rotates toward the one side and the other side alternately in the circumferential direction.

Therefore, after being fed from the hopper unit 30, the first particulate matter W1 moved toward the first fixed vessel hole 11 and the second particulate matter W2 moved toward the second fixed vessel hole 12 can be filled into the container 101 by the two first filling section Sa4 and second filling section Sa5, respectively, immediately after the end of the measuring operation, and high quality measurement accuracy can be maintained.

[Operation Procedures of Particulate Matter Filling Device 1]

Next, operation procedures of the particulate matter filling device 1 according to the present embodiment will be described with reference to FIGS. 2A to 10B.

First, the movable vessel plate 20 is stopped in a state where the first movable vessel hole 21 is located immediately below the hopper unit 30 as illustrated in FIGS. 2A and 2B.

Then, in the fixed vessel plate 10, the first fixed vessel-side moving pin 13 is in a state of stopping at a predetermined upper limit position (a position where the end surface of the first fixed vessel-side moving pin 13 inserted from above is located slightly lower than an upper end of the first fixed vessel hole 11) inside the first fixed vessel hole 11, and the second fixed vessel-side moving pin 14 is in a state of stopping at a predetermined upper limit position (a position where the end surface of the second fixed vessel-side moving pin 14 inserted from above is located slightly below an upper end of the second fixed vessel hole 12) inside the second fixed vessel hole 12.

In addition, in the movable vessel plate 20, the first movable vessel-side moving pin 26 is in a state of being stopped at a predetermined upper limit position (a position where the end surface of the first movable vessel-side moving pin 26 inserted from below is located slightly below an upper end of the first movable vessel hole 21) inside the first movable vessel hole 21, the third movable vessel-side moving pin 27 is in a state of being stopped at a predetermined upper limit position (a position where the end surface of the third movable vessel-side moving pin 27 inserted from below is located slightly below an upper end of the third movable vessel hole 23) inside the third movable vessel hole 23, and the second movable vessel-side openable lid 22b and the fourth movable vessel-side openable lid 24b are in the closed state with respect to the second movable vessel hole 22 and the fourth movable vessel hole 24, respectively.

Further, each of the first moving pin for filling 52 and the second moving pin for filling 53 is in a state of being stopped at a predetermined upper limit position above the movable vessel plate 20.

Figure 3A:
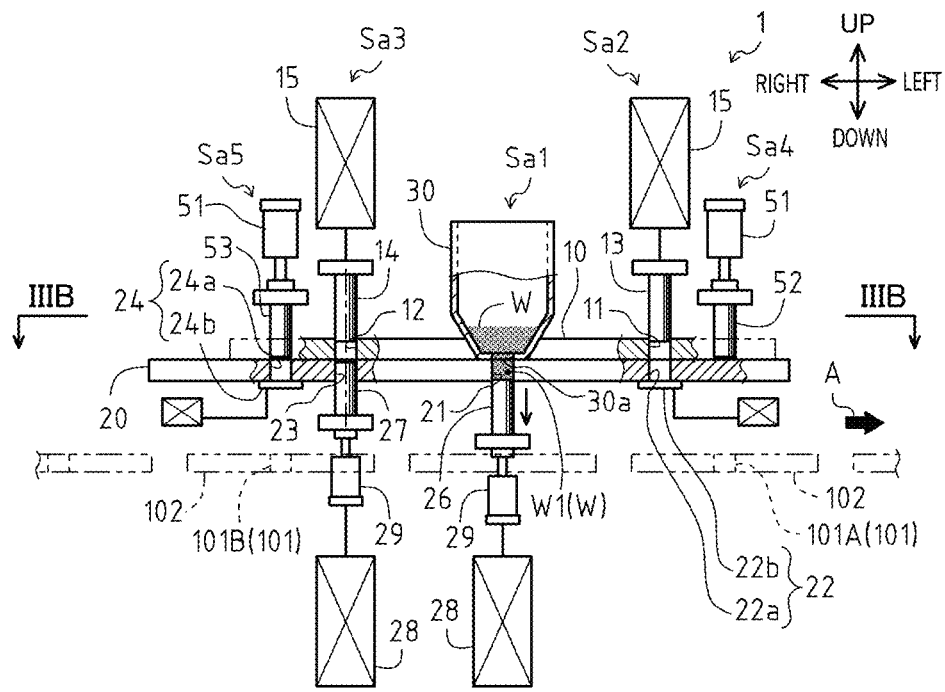
Figure 3B:
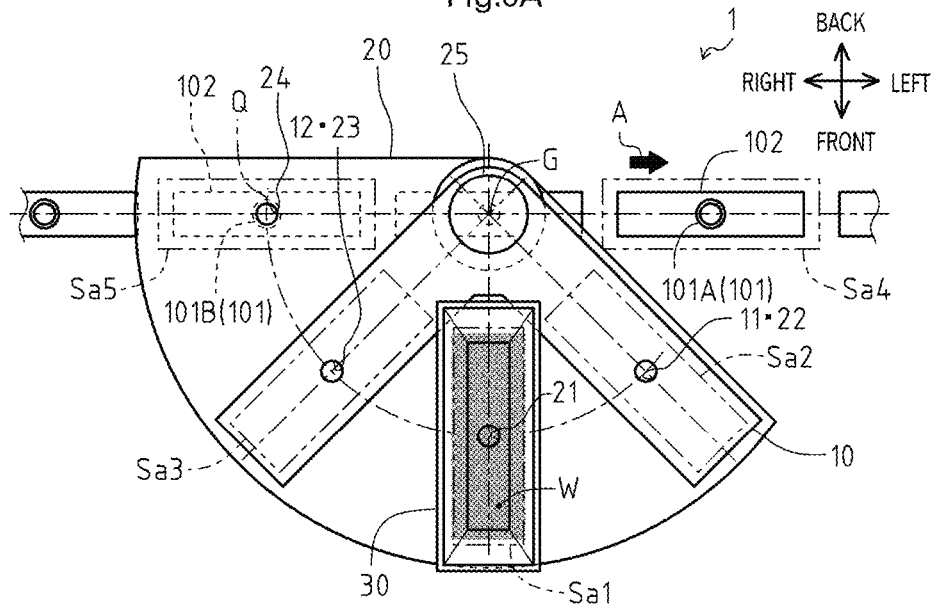

When the particulate matter filling device 1 starts to operate, the first movable vessel-side moving pin 26 is immediately moved to a predetermined lower limit position (a position where the end surface of the first movable vessel-side moving pin 26 inserted from below is located slightly above a lower end of the first movable vessel hole 21) by the electric actuator 28 as illustrated in FIGS. 3A and 3B.

As a result, a space portion having an internal volume of a predetermined capacity is formed inside the first movable vessel hole 21, and the particulate matter W (hereinafter, appropriately referred to as the "first particulate matter W1") is fed (filled) into the first movable vessel hole 21 from the hopper unit 30.

Note that the internal volume of the space portion formed in the first movable vessel hole 21 is set to be slightly larger than the internal volume (an internal volume of a space portion surrounded by an inner peripheral surface of the first fixed vessel hole 11 and the end surface of the first fixed vessel-side moving pin 13) of the first fixed vessel hole 11 at a current time point, and the first particulate matter W1 fed from the hopper unit 30 is fed to be slightly larger than the internal volume of the first fixed vessel hole 11.

Figure 4A:
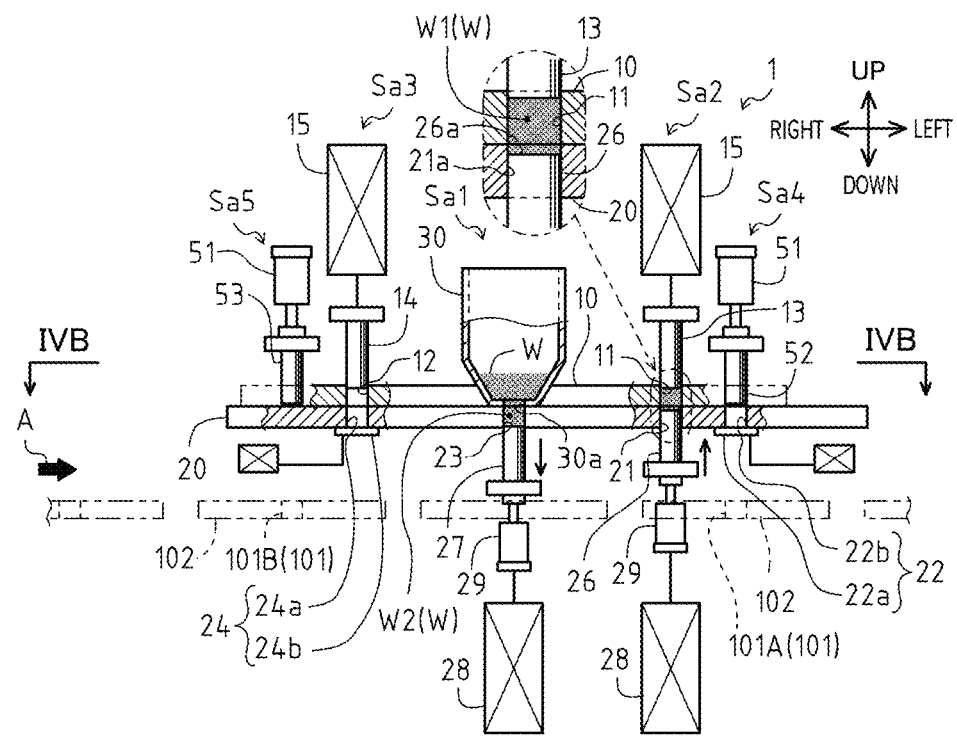
Figure 4B:
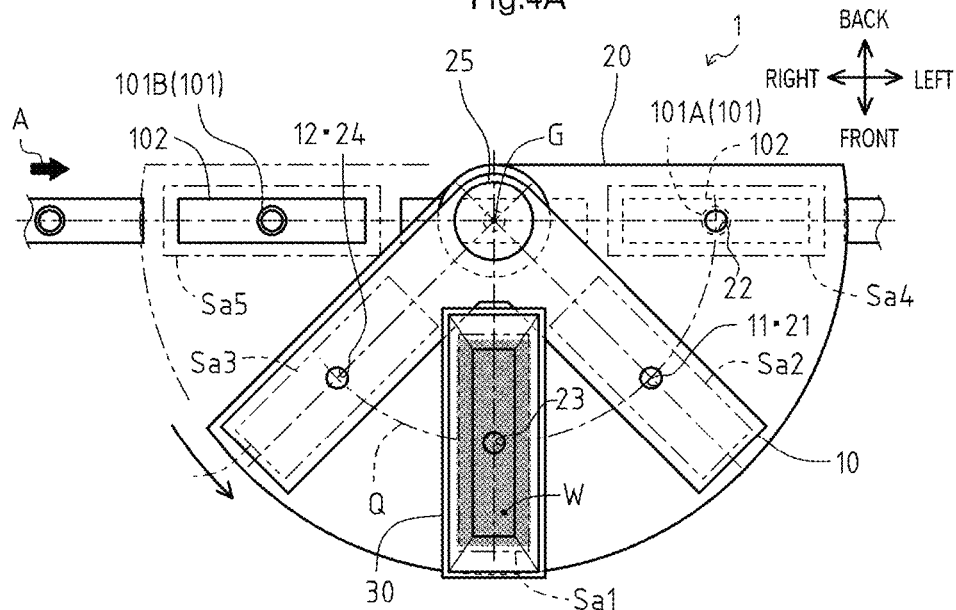

When the first particulate matter W1 is fed to the first movable vessel hole 21, the movable vessel plate 20 is rotated toward the one side (the counterclockwise direction side) in the circumferential direction described above about the rotation axis 25 by a predetermined angle (the first angle θa1 (or the second angle θa2)) as illustrated in FIGS. 4A and 4B.

As a result, the first movable vessel hole 21 is moved from a position immediately below the hopper unit 30 to a position coaxial with the first fixed vessel hole 11 in a state where the first particulate matter W1 is filled therein (the first step S01).

In addition, at the same time, the third movable vessel hole 23 is moved from a position coaxial with the second fixed vessel hole 12 to the position immediately below the hopper unit 30.

When the first movable vessel hole 21 reaches the position coaxial with the first fixed vessel hole 11, the first movable vessel-side moving pin 26 is moved to the predetermined upper limit position (the position where the end surface 26a of the first movable vessel-side moving pin 26 inserted from below is located slightly below the upper end of the first movable vessel hole 21) by the electric actuator 28.

As a result, the first particulate matter W1 is moved to the first fixed vessel hole 11, and is compressed in the up-down direction by the end surface of the first fixed vessel-side moving pin 13 and the end surface 26a of the first movable vessel-side moving pin 26 with the lower portion thereof slightly protruding to the first movable vessel hole 21.

In addition, the third movable vessel-side moving pin 27 is immediately moved to a predetermined lower limit position (a position where the end surface 27a of the third movable vessel-side moving pin 27 inserted from below is located slightly above a lower end of the third movable vessel hole 23) by the electric actuator 29.

As a result, a space portion having an internal volume equivalent to an inner volume of the first movable vessel hole 21 described above is formed inside the third movable vessel hole 23, and the particulate matter W (hereinafter, appropriately referred to as "second particulate matter W2") is fed (filled) into the third movable vessel hole 23 from the hopper unit 30.

Note that the internal volume of the space portion formed in the third movable vessel hole 23 is also set to be slightly larger than the internal volume (an internal volume of a space portion surrounded by an inner peripheral surface of the second fixed vessel hole 12 and the end surface of the second fixed vessel-side moving pin 14) of the inside of the second fixed vessel hole 12 at a current time point similarly to the internal volume of the first movable vessel hole 21 described above, and the second particulate matter W2 fed from the hopper unit 30 is fed to be slightly larger than the internal volume of the inside of the second fixed vessel hole 12.

Figure 5A:
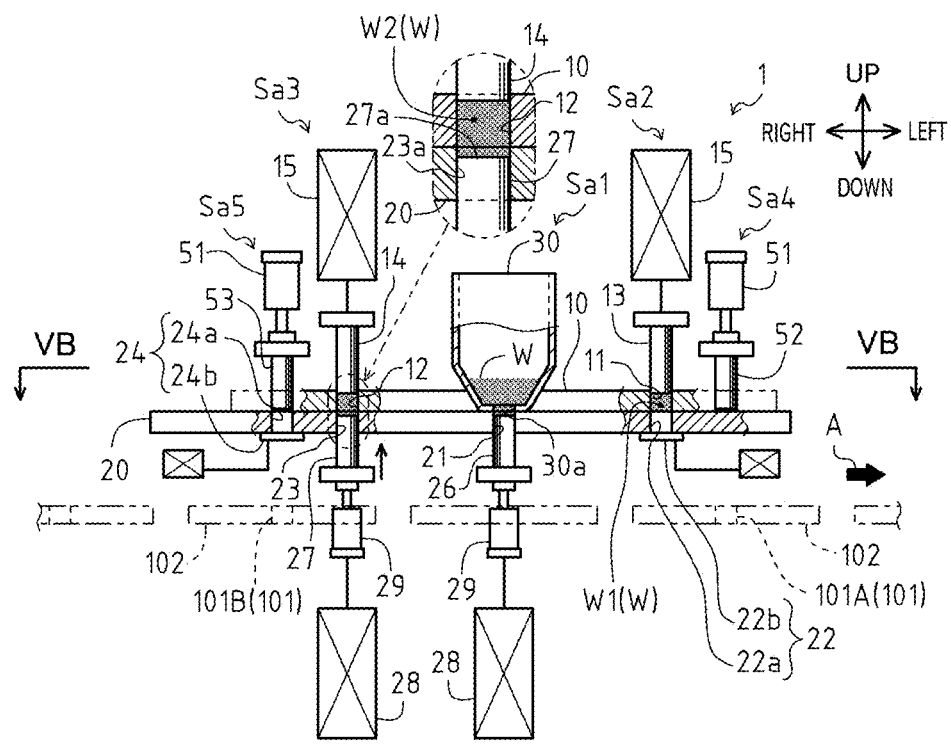
Figure 5B:
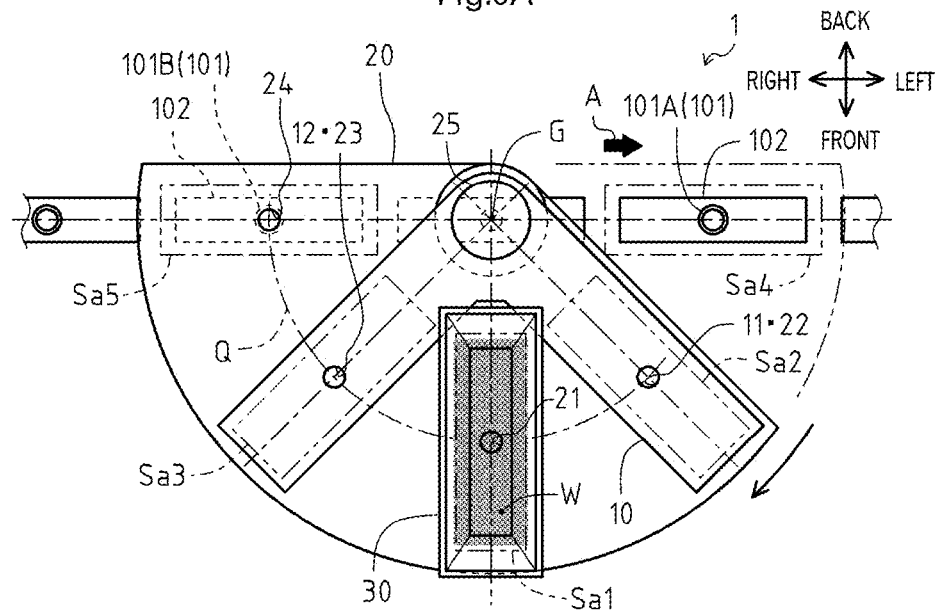

When the first particulate matter W1 is moved to the first fixed vessel hole 11 and the second particulate matter W2 is fed to the third movable vessel hole 23, the movable vessel plate 20 is rotated toward the other side (the clockwise direction side) in the circumferential direction described above about the rotation axis 25 by a predetermined angle (the first angle θa1 (or the second angle θa2)) as illustrated in FIGS. 5A and 5B.

As a result, the first particulate matter W1 is leveled by the rotating movable vessel plate 20, and is modified (measured)

to have a desired volume, that is, a volume equivalent to the internal volume of the first fixed vessel hole 11, and the measuring operation on the first particulate matter W1 is performed.

In addition, the third movable vessel hole 23 is moved from the position immediately below the hopper unit 30 to the position coaxial with the second fixed vessel hole 12 in a state where the second particulate matter W2 is filled therein (the second step S02).

When the third movable vessel hole 23 reaches the position coaxial with the second fixed vessel hole 12, the third movable vessel-side moving pin 27 is moved to a predetermined upper limit position (a position where the end surface 27a of the third movable vessel-side moving pin 27 inserted from below is located slightly below the upper end of the third movable vessel hole 23) by the electric actuator 28.

As a result, the second particulate matter W2 is moved to the second fixed vessel hole 12, and is compressed in the up-down direction by the end surface of the second fixed vessel-side moving pin 14 and the end surface 27a of the third movable vessel-side moving pin 27 with the lower portion thereof slightly protruding from the third movable vessel hole 23.

Figure 6A:
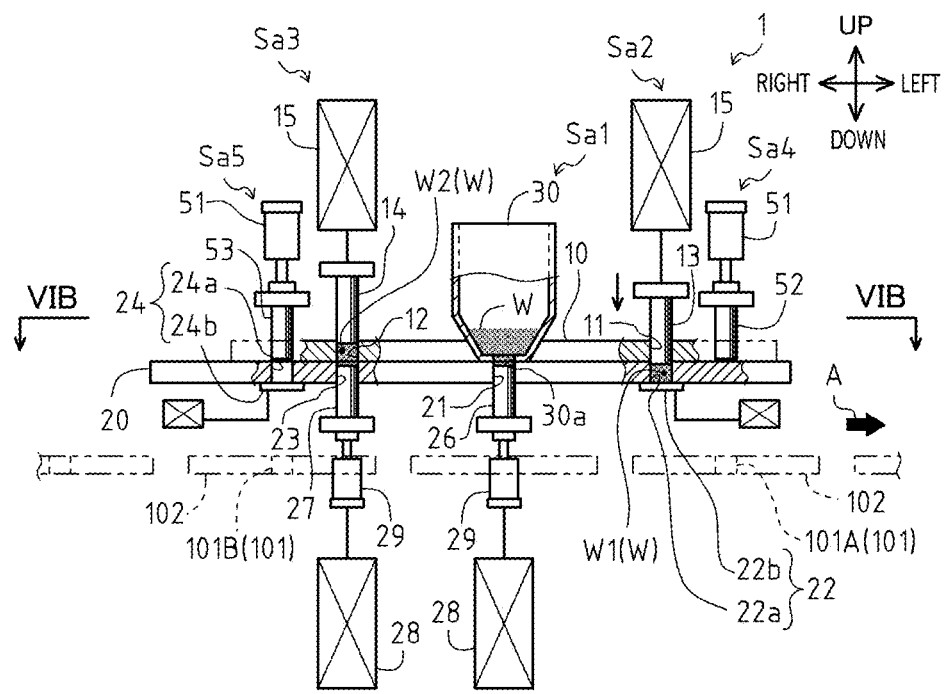
Figure 6B:
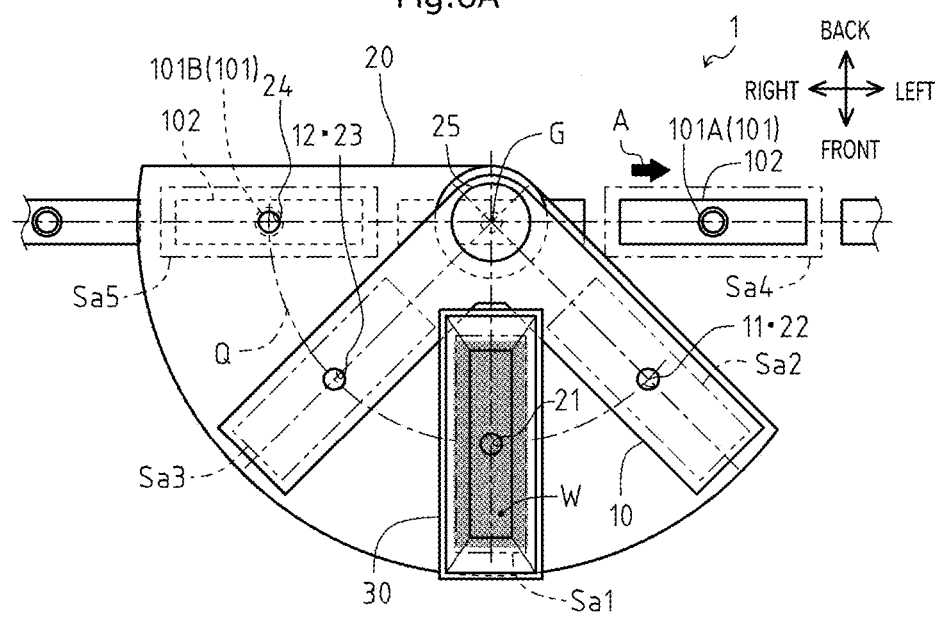

At the same time, as illustrated in FIGS. 6A and 6B, the first fixed vessel-side moving pin 13 is moved to a predetermined lower limit position (a position where the end surface of the first fixed vessel-side moving pin 13 inserted from above is located near a lower end of the first fixed vessel hole 11 (slightly above or slightly below the lower end)) by the electric actuator 15.

As a result, the first particulate matter W1 subjected to the measuring operation is moved to the second movable vessel hole 22.

Figure 7A:
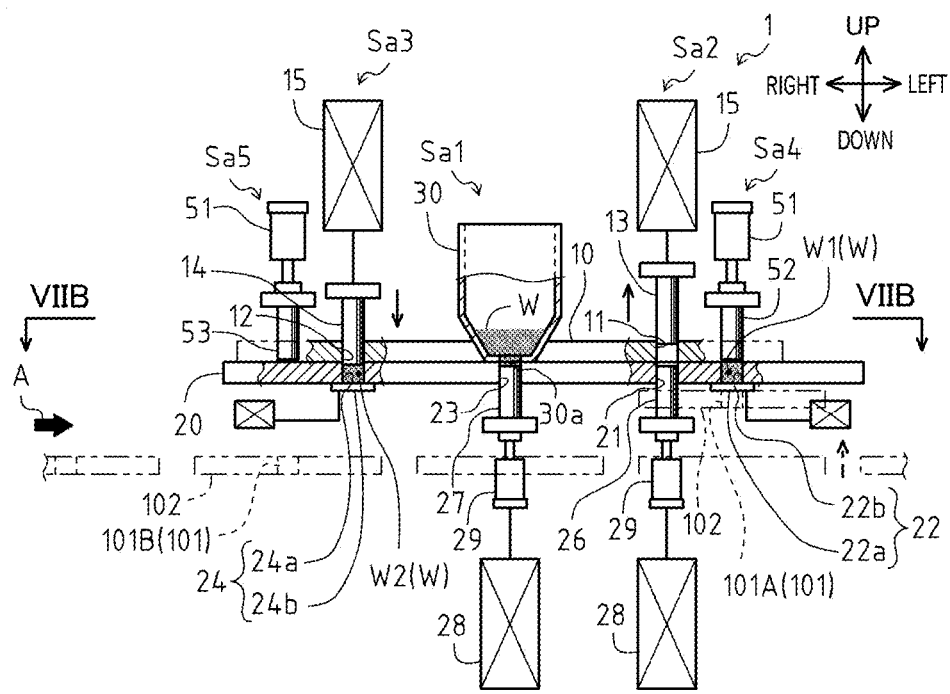
Figure 7B:
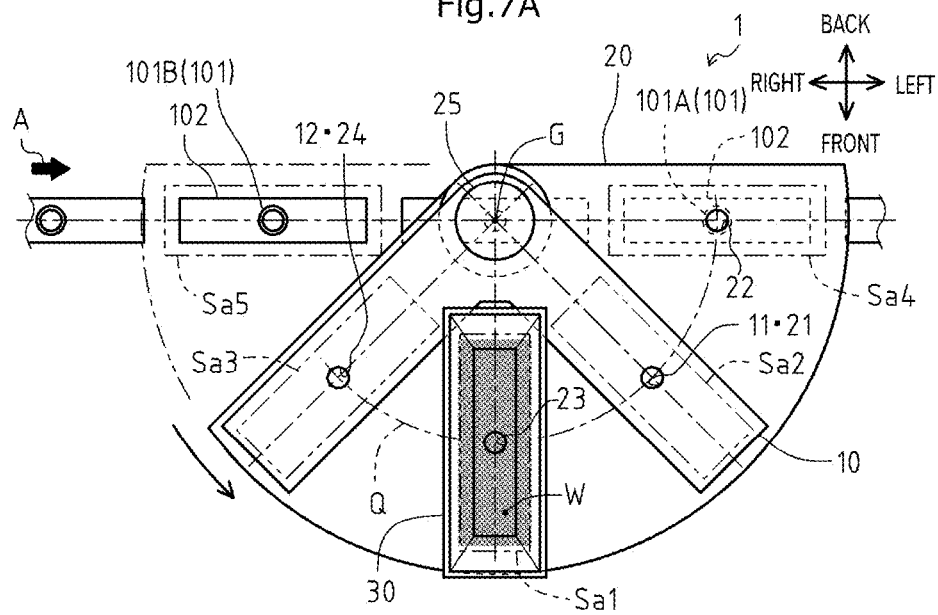

When the first particulate matter W1 is moved to the second movable vessel hole 22 and the second particulate matter W2 is moved to the second fixed vessel hole 12, the first fixed vessel-side moving pin 13 is moved to the predetermined upper limit position by the electric actuator 15, and then the movable vessel plate 20 is rotated again toward the one side (the counterclockwise direction side) in the circumferential direction described above about the rotation axis 25 by a predetermined angle (the first angle $\theta a1$ (or the second angle $\theta a2$)) as illustrated in FIGS. 7A and 7B.

As a result, the second particulate matter W2 is leveled by the rotating movable vessel plate 20, and is modified (measured) to have a desired volume, that is, a volume equivalent to the internal volume of the second fixed vessel hole 12, and the measuring operation on the second particulate matter W2 is performed.

In addition, the second movable vessel hole 22 is moved from the position coaxial with the first fixed vessel hole 11 to the position immediately above the container 101 (hereinafter, appropriately described as the "first container 101A") stopped at a predetermined position in advance in a state where the first particulate matter W1 is filled therein (the third step S03).

In this manner, in the present embodiment, the measuring operation on the first particulate matter W1 and the measuring operation on the second particulate matter W2 respectively performed in the second step S02 and the third step S03 described above are performed by leveling the particulate matter W fed from the hopper unit 30 in the compressed state.

Since the fed particulate matter W is leveled in the compressed state in this manner, for example, air existing at the time of feeding can be effectively removed from the particulate matter W, and higher quality measurement accuracy on a volume basis can be achieved.

When the second movable vessel hole 22 reaches a position immediately above the first container 101A, the first container 101A is raised together with the pallet 102 and moved to the vicinity of a lower end of the second movable vessel hole 22.

In addition, at the same time, the second fixed vessel-side moving pin 14 is moved to a predetermined lower limit position (a position where the end surface of the second fixed vessel-side moving pin 14 inserted from above is located near the lower end of the second fixed vessel hole 12 (slightly above or slightly below the lower end)) by the electric actuator 15.

As a result, the second particulate matter W2 subjected to the measuring operation is moved to the fourth movable vessel hole 24.

Figure 8A:
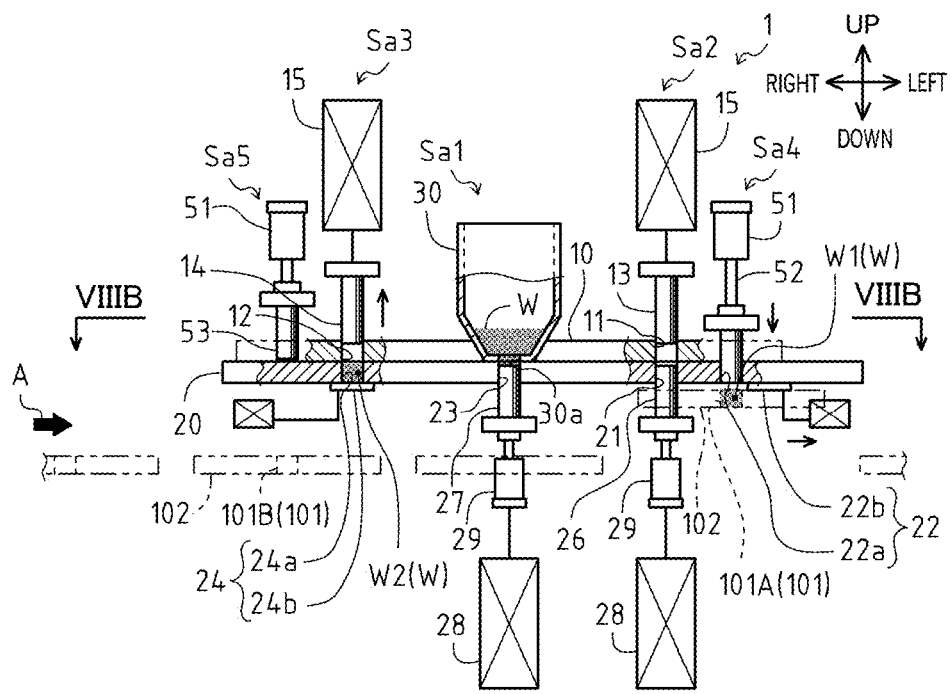
Figure 8B:
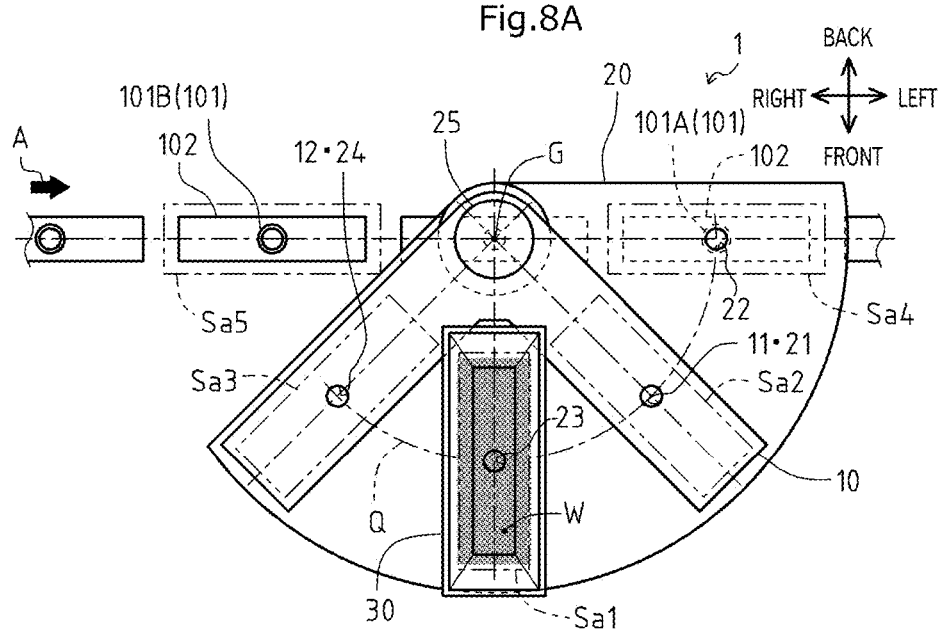

When the first container 101A is moved to the vicinity of the lower end of the second movable vessel hole 22 and the second particulate matter W2 is moved to the fourth movable vessel hole 24, as illustrated in FIGS. 8A and 8B, the second movable vessel-side openable lid 22b is brought into the open state with respect to the second movable vessel hole 22, and then the first moving pin for filling 52 is moved to a predetermined lower limit position (a position where an end surface of the first moving pin for filling 52 inserted from above is located near the lower end of the second movable vessel hole 22 (slightly above or slightly below the lower end)) by the movable means 51.

As a result, the first particulate matter W1 subjected to the measuring operation is introduced (filled) into the first container 101A, and an operation of filling the first particulate matter W1 into the first container 101A is performed.

In addition, at the same time, the second fixed vessel-side moving pin 14 is moved to the predetermined upper limit position by the electric actuator 15.

Figure 9A:
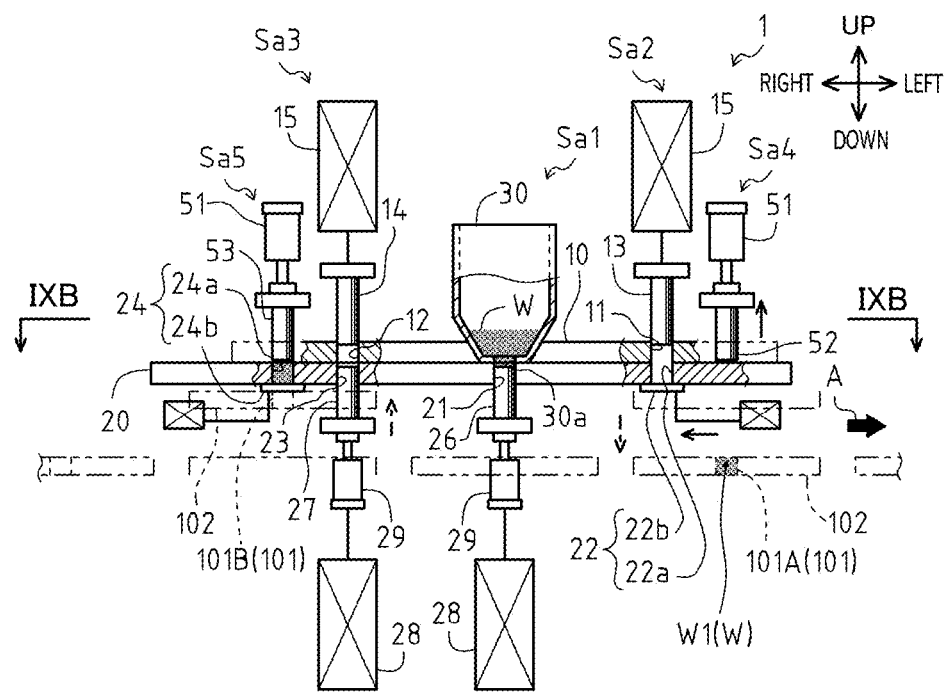
Figure 9B:
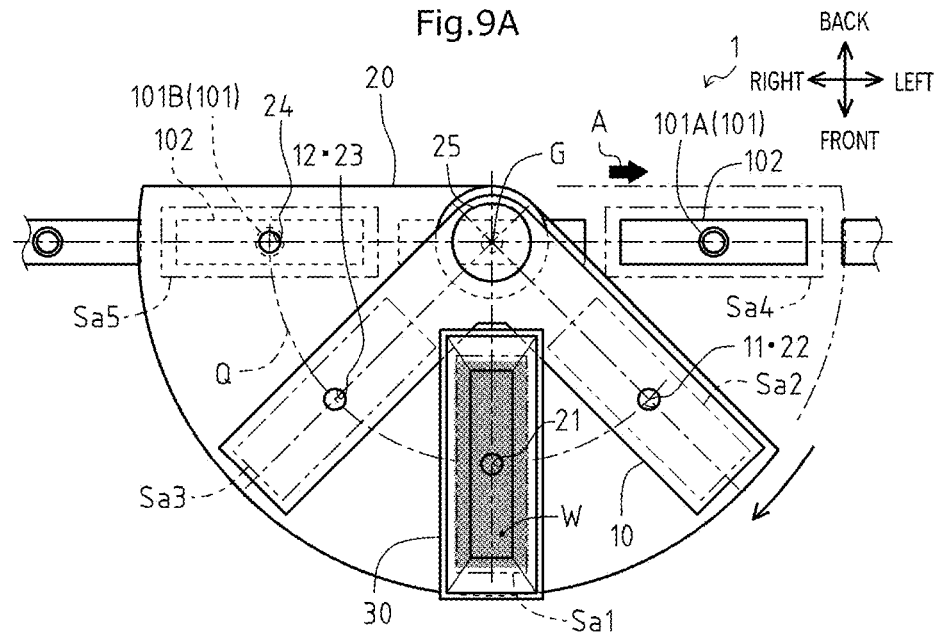

In addition, when the first particulate matter W1 is introduced into the first container 101A, as illustrated in FIGS. 9A and 9B, the second movable vessel-side openable lid 22b is brought into the closed state with respect to the second movable vessel hole 22, and the first moving pin for filling 52 is moved to the above-described predetermined upper limit position by the movable means 51.

In addition, at the same time, the first container 101A filled with the first particulate matter W1 is lowered together with the pallet 102 and returned to a predetermined position.

Thereafter, the movable vessel plate 20 is rotated again toward the other side (the clockwise direction side) in the circumferential direction described above about the rotation axis 25 by a predetermined angle (the first angle $\theta a1$ (or the second angle $\theta a2$)).

As a result, the fourth movable vessel hole 24 is moved from the position coaxial with the second fixed vessel hole 12 to the position immediately above the container 101 (hereinafter, appropriately described as the "second container 101B") stopped at a predetermined position in advance in a state where the second particulate matter W2 is filled therein (the fourth step S04).

When the fourth movable vessel hole 24 reaches a position immediately above the second container 101B, the second container 101B is raised together with the pallet 102 and moved to the vicinity of a lower end of the fourth movable vessel hole 24.

Figure 10A:
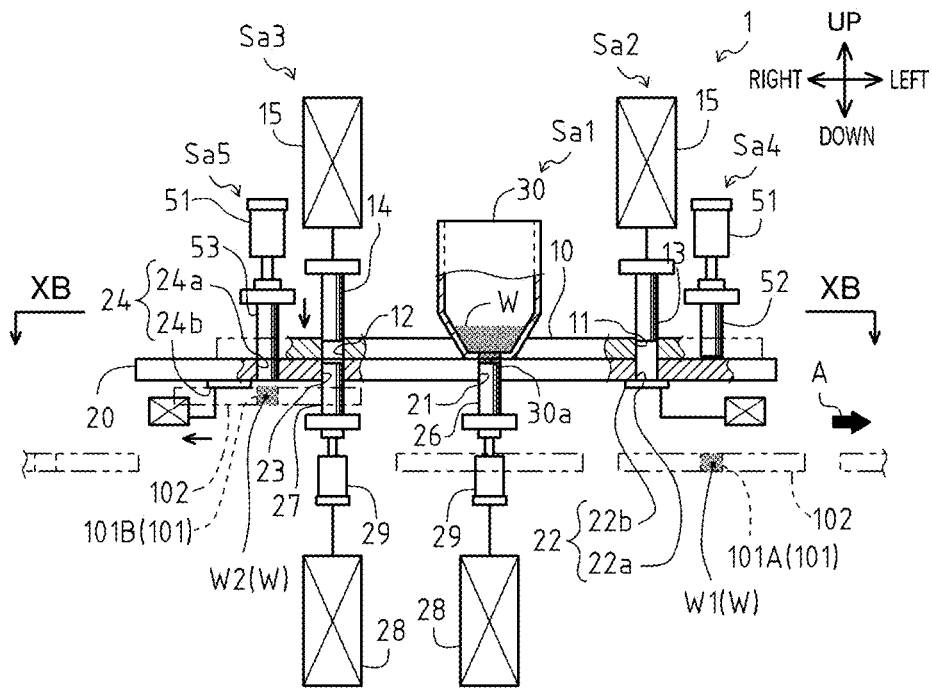
Figure 10B:
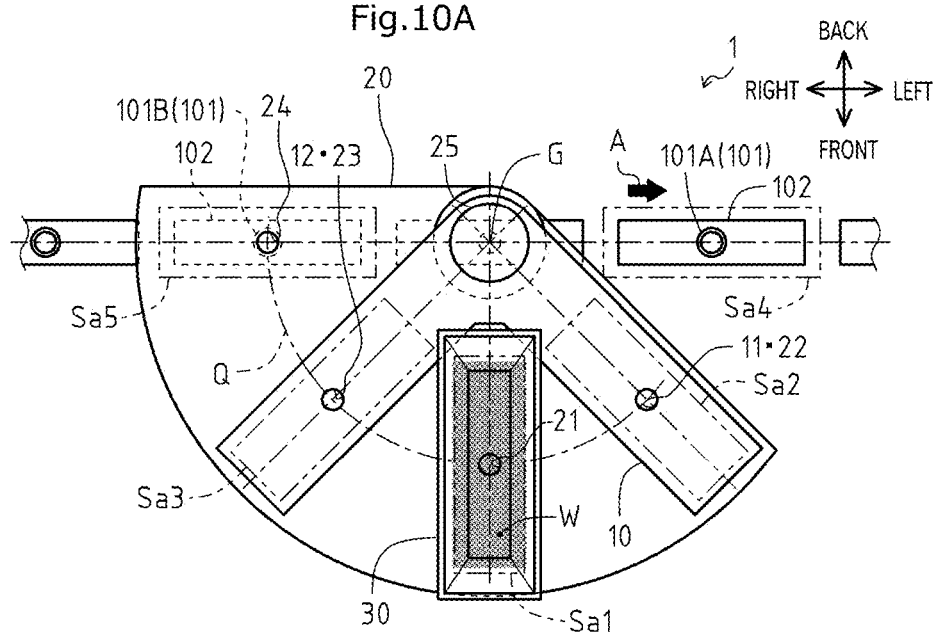

When the second container 101B is moved to the vicinity of the lower end of the fourth movable vessel hole 24, as illustrated in FIGS. 10A and 10B, the fourth movable vessel-side openable lid 24b is brought into the open state with respect to the fourth movable vessel hole 24, and then the second moving pin for filling 53 is moved to a predetermined lower limit position (a position where an end surface of the second moving pin for filling 53 inserted from above is located near the lower end of the fourth movable vessel hole 24 (slightly above or slightly below the lower end)) by the movable means 51.

As a result, the second particulate matter W2 subjected to the measuring operation is introduced (filled) into the second container 101B, and an operation of filling the second particulate matter W2 into the second container 101B is performed.

In addition, when the second particulate matter W2 is introduced into the second container 101B, the fourth movable vessel-side openable lid 24b is brought into the closed state with respect to the fourth movable vessel hole 24, and the second moving pin for filling 53 is moved to the above-described predetermined upper limit position by the movable means 51.

As a result, a series of operation procedures of the particulate matter filling device 1 according to the present embodiment ends.

Note that, after the series of operation procedures described above ends, the series of operation procedures may be repeated again in the particulate matter filling device 1 according to the present embodiment. However, as described above, new particulate matter W may be immediately fed immediately after reaching the position immediately below the hopper unit 30 with respect to the first movable vessel hole 21 in a substantially empty state as the first particulate matter W1 is moved to the first fixed vessel hole 11 in the second step S02, and new particulate matter W may be fed immediately after reaching the position immediately below the hopper unit 30 with respect to the third movable vessel hole 23 in a substantially empty state as the second particulate matter W2 is moved to the second fixed vessel hole 12 in the subsequent third step S03.

In this case, the movable vessel plate 20 is repeatedly rotated alternately toward one direction (the counterclockwise direction side) and the other side (the clockwise direction side) in the circumferential direction about the rotation axis 25, so that the particulate matter W fed from the hopper unit 30 reaches the position immediately above the first container 101 and the position immediately above the second container 101 without interruption and is continuously filled into the predetermined container 101.

Although the embodiment embodying the present invention have been described above, the embodiment does not limit the present invention in any way, but are merely illustrative. It is a matter of course that the present invention can be implemented in various other forms within a scope not departing from the gist thereof, and the scope of the present invention is indicated by the description of the claims, and further encompasses meanings equivalent to the description of the claims and all changes within the scope.

For example, the operation of filling the particulate matter W is performed with respect to one container 101 disposed on the pallet 102 in the present embodiment, but the present invention is not limited thereto, and the operation of filling the particulate matter W may be performed with respect to a plurality of containers 101, 101, and the like disposed on the pallet 102.

In this case, the number and disposed positions of the first fixed vessel hole 11 and the second fixed vessel hole 12 provided in the fixed vessel plate 10, the first movable vessel hole 21 to the fourth movable vessel hole 24 provided in the movable vessel plate 20, and the first fixed vessel-side moving pin 13, the second fixed vessel-side moving pin 14, the first movable vessel-side moving pin 26, the second movable vessel-side moving pin 27, the first moving pin for filling 52, and the second moving pin for filling 53 corresponding to these various vessel holes are appropriately set on the basis of the number and disposed positions of the plurality of containers 101, 101, and the like disposed on the pallet 102.

In addition, the particulate matter W to be filled in the present embodiment may have any particle size, and it can be said that the particulate matter W having a difference between a volume immediately after being fed from the hopper unit 30 and a volume after being compressed, for example, is more preferable since the particulate matter filling method and the particulate matter filling device 1 according to the present embodiment can accurately perform the measuring operation.

Note that examples of the particulate matter W to be filled in the present embodiment include a desiccant and/or an oxygen absorber.

Here, conventionally known matter can be used as the desiccant and the oxygen absorber.

Regarding the desiccant, any matter absorbing moisture may be used.

In addition, regarding the oxygen absorber, any matter absorbing oxygen may be used.

Then, the particulate matter W employed in the present embodiment may use only one of the desiccant and the oxygen absorber, or may use both the desiccant and the oxygen absorber.

In addition, the desiccant and the oxygen absorber may be used alone, or may be used in combination of two or more types thereof.

REFERENCE SIGNS LIST 1 particulate matter filling device
10 fixed vessel plate
11 first fixed vessel hole
12 second fixed vessel hole
20 movable vessel plate
21 first movable vessel hole
21a first movable vessel-side through hole
22 second movable vessel hole
23 third movable vessel hole
23a third movable vessel-side through hole
24 fourth movable vessel hole
26 first movable vessel-side moving pin
26a end surface
27 third movable vessel-side moving pin
27a end surface
28 electric actuator (movement means)
29 buffer means
30 hopper unit
101 container
101A first container
101B second container
G axial center
S01 first step
S02 second step
S03 third step
S04 fourth step
S05 fifth Step
Sa1 feeding section
Sa2 first measuring section
Sa3 second measuring section
Sa4 first filling section Sa5 second filling section
W particulate matter
W1 first particulate matter
W2 second particulate matter

The invention claimed is:

1. A particulate matter filling method for measuring a volume of particulate matter and filling the particulate matter into a container,
wherein a feeding section that feeds the particulate matter,
a first measuring section and a first filling section disposed in a stated order toward one side with respect to the feeding section, and
a second measuring section and a second filling section disposed in a stated order toward another side with respect to the feeding section are provided,
the first measuring section and the second measuring section performing a measuring operation of modifying the volume of the fed particulate matter to a desired volume by leveling, and
the first filling section and the second filling section performing a filling operation of introducing the particulate matter modified to have the desired volume into the container,
the particulate matter filling method comprising:
moving first particulate matter fed through the feeding section to the first measuring section toward the one side;
moving second particulate matter fed through the feeding section to the second measuring section toward the another side and performing the measuring operation on the first particulate matter moved to the first measuring section;
moving the first particulate matter modified to have a desired volume by the measuring operation to the first filling section toward the one side and performing the measuring operation on the second particulate matter moved to the second measuring section;
performing the filling operation on the first particulate matter moved to the first filling section, and then moving the second particulate matter modified to have a desired volume by the measuring operation to the second filling section toward the another side; and
performing the filling operation on the second particulate matter moved to the second filling section.

2. The particulate matter filling method according to claim 1, wherein during the moving of the second particulate to the second measuring section and during the moving of the first particulate matter to the first filling section, the measuring operation is performed by leveling the fed particulate matter in a compressed state.

3. The particulate matter filling method according to claim 2, wherein the particulate matter is a desiccant and/or an oxygen absorber.

4. The particulate matter filling method according to claim 1, wherein the particulate matter is a desiccant and/or an oxygen absorber.

5. A particulate matter filling device that measures a volume of particulate matter and fills the particulate matter into a container, the particulate matter filling device comprising:
a fixed vessel plate disposed horizontally;
a movable vessel plate disposed horizontally in contact with a lower surface of the fixed vessel plate, and provided to be rotatable about an axial center in a vertical direction; and
a hopper unit disposed immediately above the movable vessel plate,
wherein the fixed vessel plate includes a first fixed vessel hole, located on one side in a circumferential direction about the axial center with respect to the hopper unit, and a second fixed vessel hole located on another side in the circumferential direction,
the movable vessel plate includes a first movable vessel hole and a second movable vessel hole, which are located in a stated order toward the one side in the circumferential direction and are able to be disposed coaxially with the first fixed vessel hole, and a third movable vessel hole and a fourth movable vessel hole which are located in a stated order toward the another side in the circumferential direction and are able to be disposed coaxially with the second fixed vessel hole,
in the fixed vessel plate, the first fixed vessel hole and the second fixed vessel hole are recessed holes that open downward, and have bottom surfaces provided to be movable up and down, and
in the movable vessel plate, the first movable vessel hole, the second movable vessel hole, the third movable vessel hole, and the fourth movable vessel hole are recessed hole portions that open upward, a bottom surface of the first movable vessel hole and a bottom surface of the third movable vessel hole are provided to be movable up and down, and a bottom surface of the second movable vessel hole and a bottom surface of the fourth movable vessel hole are provided to be openable.

6. The particulate matter filling device according to claim 5, wherein
in the movable vessel plate,
the first movable vessel hole includes:
a first movable vessel-side through hole penetrating in an up-down direction; and
an end surface of a first movable vessel-side moving pin that penetrates the first movable vessel-side through hole from below and is slidable in the up-down direction, and
the third movable vessel hole includes:
a third movable vessel-side through hole penetrating in the up-down direction; and
an end surface of a third movable vessel-side moving pin that penetrates the third movable vessel-side through hole from below and is slidable in the up-down direction.

7. The particulate matter filling device according to claim 6, wherein
the movable vessel plate includes:
a movement actuator for moving each of the first movable vessel-side moving pin and the third movable vessel-side moving pin in the up-down direction; and
a buffer actuator interposed between the movement actuator and each of the first movable vessel-side moving pin and the third movable vessel-side moving pin,
the movement actuator and the buffer actuator being provided in each of the first movable vessel hole and the third movable vessel hole.

8. The particulate matter filling device according to claim 7, wherein the particulate matter is a desiccant and/or an oxygen absorber.

9. The particulate matter filling device according to claim 6, wherein the particulate matter is a desiccant and/or an oxygen absorber.

10. The particulate matter filling device according to claim 5, wherein the particulate matter is a desiccant and/or an oxygen absorber.

\* \* \* \* \*